United States Patent [19]

Ishida

[11] Patent Number: 5,729,750
[45] Date of Patent: Mar. 17, 1998

[54] AUTOMATIC DIMENSIONING IN COMPUTER AIDED DESIGN

[75] Inventor: Tsutomu Ishida, Kyoto, Japan

[73] Assignee: Rohm Co. Ltd., Kyoto, Japan

[21] Appl. No.: 474,196

[22] Filed: Jun. 7, 1995

[30] Foreign Application Priority Data

Jun. 11, 1994 [JP] Japan .................................. 6-152642

[51] Int. Cl.$^6$ .................................................. G06F 17/50
[52] U.S. Cl. ............................ 395/763; 395/964; 345/443
[58] Field of Search .................................... 395/143, 964, 395/763

[56] References Cited

U.S. PATENT DOCUMENTS

| | | | |
|---|---|---|---|
| 4,855,939 | 8/1989 | Fitzgerald, Jr. et al. | 364/522 |
| 5,539,868 | 7/1996 | Hosoya et al. | 395/151 |
| 5,548,706 | 8/1996 | Koizumi et al. | 395/161 |
| 5,548,707 | 8/1996 | LoNegro et al. | 395/161 |

FOREIGN PATENT DOCUMENTS 5165902  7/1993  Japan .

OTHER PUBLICATIONS

Dori, Dov, "Intelligent Automatic Dimensioning of CAD Engineering Machine Drawing," Internationl Journal of Robotics and Automation, vol. 5, No. 3, pp. 124–130, Jan. 1990.

Dori, Dov, "Dimensioning Analysis: Toward Automatic Understanding of Engineering Drawings," Communications of the ACM, vol. 35, No. 10, pp. 92–103, Oct. 1992.

Primary Examiner—Joseph H. Feild
Assistant Examiner—Jennifer C. Chen
Attorney, Agent, or Firm—Michael D. Bednarek; Kilpatrick Stockton LLP

[57] ABSTRACT

Substantially automatic dimensioning is performed in computer aided design for a design item. For this purpose, different kinds of constituent elements are registered in different tables based on which provisional dimensioning is performed along an X-axis and a Y-axis to generate provisional dimensioning lines in different stages. Then, the provisional dimensioning lines are rearranged in a manner such that larger valued dimensioning lines are located farther from the design item than smaller valued dimensioning lines. Leader dimensioning may be further performed with respect to such elements as 45°-chamfer elements, arc elements, circles and section bores.

20 Claims, 23 Drawing Sheets

Fig. 15

Geometric Element File

| NO. | Element Definition | Notes |
|---|---|---|
| 0 | (0,1) (3,0) | |
| 1 | (0,1) (0,32) | |
| 2 | (3,0) (40,0) | |
| 3 | (40,0) (40,20) | |
| 4 | (40,20) (57,20) | |
| 5 | (57,20) (60,23) | |
| 6 | (60,23) (60,35) | |
| 7 | (55,35) (60,35) | |
| 8 | (55,35) (55,40) | |
| 9 | (36.5,36) (36.5,40) | |
| 10 | (33.5,36) (33.5,40) | |
| 11 | (21.5,36) (21.5,40) | |
| 12 | (18.5,36) (18.5,40) | |
| 13 | (12,40) (55,40) | |
| 14 | (0,32) (12,40) | |
| 15 | (10,30) (R=5) | |
| 16 | (50,30) (R=5) | |
| 17 | (10,10) (R=1.8) | |
| 18 | (30,10) (R=1.8) | |
| | | |
| | | |
| 7* | (60,35) (55,40) (R=5) O=55,35) | |

X-Dimensioning Table

| NO. | Element Definition | Extension Line Orientation | Notes |
|---|---|---|---|
| 2 | (3,0) (40,0) | downward | |
| 4 | (40,20) (57,20) | downward | |
| 7 | (55,35) (60,35) | Upward | |
| 13 | (12,40) (55,40) | Upward | |
| 14 | (0,32) (12,40) | Upward | |
| 0 | (0,1) (3,0) | downward | |

| | | | |
|---|---|---|---|
| 2' | (0,1) (40,0) | downward | |
| | | | |
| 13' | (0,32) (60,35) | Upward | |
| 13" | (0,32) (55,40) | Upward | |

Y-Dimensioning Table

| NO. | Element Definition | Extension Line Orientation | Notes |
|---|---|---|---|
| 1 | (0,1) (0,32) | Leftward | |
| 3 | (40,0) (40,20) | Rightward | |
| 6 | (60,23) (60,35) | Rightward | |
| 8 | (55,35) (55,40) | Rightward | |
| 14 | (0,32) (12,40) | Leftward | |
| 0 | (0,1) (3,0) | Leftward | |

| | | | |
|---|---|---|---|
| 1' | (3,0) (12,40) | Leftward | |
| | | | |
| 6' | (57,20) (60,35) | Rightward | |

Fig. 18

45° – Chamfer Element Table

| NO. | Element Definition | Notes |
|---|---|---|
| 5 | (57,20) (60,23) | |
| | | |
| | | |

Fig. 19

Arc Element Table

| NO. | Element Definition | Notes |
|---|---|---|
| 7* | (60,35) (55,40) (R=5)(O=55,35) | |
| | | |
| | | |

Fig. 20

Circle Element Table

| NO. | Element Definition | Specificaton | Notes |
|---|---|---|---|
| 15 | (10,30) (R=5) | φ10 Bore | |
| 16 | (50,30) (R=5) | φ10 Bore | |
| 17 | (10,10) (R=1.8) | M5 Tap Bore | |
| 18 | (30,10) (R=1.8) | M5 Tap Bore | |
| | | | |

Fig. 21

Section Bore Element Table

| NO. | Element Definition | Specificaton | Notes |
|---|---|---|---|
| 9 | (36.5,36) (36.5,40) | M 4 Tap Bore | |
| 10 | (33.5,36) (33.5,40) | | |
| 11 | (21.5,36) (21.5,40) | M 4 Tap Bore | |
| 12 | (18.5,36) (18.5,40) | | |
| | | | |

AUTOMATIC DIMENSIONING IN COMPUTER AIDED DESIGN

BACKGROUND OF THE INVENTION

1. Field of the Invention

This invention relates to automatic dimensioning in computer aided design (CAD). More particularly, the present invention relates to a method and an apparatus for performing substantially automatic dimensioning in CAD.

2. Definition of the Terms

For purposes of conveniently describing the present invention, several of the terms used herein are defined as follows.

The term "design elements" means any elements which are used to constitute a design item (figure, form, shape, and etc.). For instance, the "design elements" include line segments, circles, arcs, and so forth, represented by any different kinds of lines (thin lines, thick lines, broken lines, chain lines, dotted lines) in any colors.

The term "drawing elements" means any elements which are used for drawing or designing purposes. Thus, the term "drawing elements" is broader than the term "design elements". For example, the "drawing elements" include, in addition to the "design elements" defined above, any signs, symbols, numerals, characters, letters, dimensioning lines and so forth which may be used in association with the design elements.

The term "dimensioning lines" means any lines and indications (signs, symbols, numeral, characters, letters and so on) which are used for dimensioning purposes. Thus, the "dimensioning lines" include extension lines, arrow-headed dimension lines, indications of dimension values, and indications of counts (how many).

The term "X-dimensioning lines" used herein includes extension lines taken out in Y-direction (in XY-coordinate system), arrow-headed dimension lines extended in X-direction between the extension lines, and dimension value indications.

Similarly, the term "Y-dimensioning lines" used herein includes extension lines taken out in X-direction, arrow-headed dimension lines extended in Y-direction between the extension lines, and dimension value indications.

The term "leader dimensioning" is used to mean dimensioning which utilizes leaders (leader lines) in connection with chamfers, corner arcs and bores for example.

3. Description of the Background Art

Nowadays, CAD is increasingly used because it greatly reduces the time and labor required for designing complicated articles, devices and plants for example. In general, a CAD system comprises an input unit (e.g. keyboard and mouse), a processing unit (CPU), a display unit (e.g. CRT), and an output unit (e.g. plotter and printer). In use, the designer enters specific instructions into the processing unit through the input unit to prepare an intended design item (drawing). During the design process or upon completion thereof, the processing unit causes the display unit to display a design image, or causes the output unit to make a printout.

In CAD, typically, a design item may be assembled from line segments, circles and arcs for example. Each of the line segments can be defined by the coordinates, in an XY-coordinate system, of the respective ends of the line segment. Each of the circles can be defined by the XY-coordinates of the circle center point as well as the radius of the circle. Each of the arcs can be defined by the XY-coordinates of the respective ends of the arc as well as the radius of the arc.

Further, either of the above-described design elements can also be defined by polar coordinates combined with radius values (where applicable). However, XY-coordinates and polar coordinates are mutually convertible, so that the difference between the two methods of performing element definition is insignificant. It should be appreciated that the element definition data may additionally include pieces of information relating the kinds of lines (e.g. thick lines, thin lines, broken lines, chain lines, and so forth) and/or the colors of lines.

In CAD, a design item is formed by entering definition data for various design elements through the keyboard or by plotting the end points for a line segment on the CRT. The designed image is stored in the memory not as image data but as a combination of the definition data for the various elements. Thus, the element definition data stored in the memory can be conveniently used for dimensioning the formed design item.

Various methods have been hitherto proposed for dimensioning a design item in CAD. However, none of the known methods have been found satisfactory.

For instance, Japanese Patent Application Laid-open No. 5-165902 discloses a method of progressively dimensioning a design item in CAD. However, the method disclosed in this laid-open application is usable only for limited elements of the design item. This known method requires the operator (designer) to enter successive instructions for progressive dimensioning, thereby failing to realize substantially automatic dimensioning.

Other methods for performing dimensioning in CAD are also known. For purposes of convenience of the description, some examples are illustrated in FIGS. 24a through 28b.

FIGS. 24a and 24b illustrate an example used for inserting length indications. As shown in FIG. 24a, positions for taking out extension lines are designated by rectangular cursors 1, 2 and 3, whereas a positional stage for arrow-headed dimension lines is designated by a triangular cursor 4. As a result, length indications are inserted, as shown in FIG. 24b.

FIGS. 25a and 25b illustrate another example used for inserting length, indications. As shown in FIG. 25a, a dimensioning area is designated by triangular cursors 1' and 2', whereas a positional stage for arrow-headed dimension lines is designated by a rectangular cursor 3'. In this known method, points from which extension lines are drawn out are automatically determined by locating the connections between different line segments. As a result, length indications are inserted, as shown in FIG. 25b.

FIGS. 26a and 26b illustrate an example used for performing leader dimensioning for similar tap bores. As shown in FIG. 26a, one of the similar tap bores used for leader dimensioning is designated by a rectangular cursor 1", whereas a position for inserting a dimensional indication is designated by triangular cursors 2" and 3". As a result, leader dimensioning is performed to indicate the nominal diameter of the tap bores together with the count (number) of the bores, as shown in FIG. 26b.

In any of the examples illustrated in FIGS. 24a through 26b, the operator need to designate the positions and/or areas used for dimensioning. Thus, the dimensioning operation will be greatly time-taking for more complicated design items, and the quality of dimensioning depends largely on the operator's skill. Further, it is likely that the operator may fail to perform dimensioning for certain elements of the design item.

FIG. 27 illustrate typical dimensioning errors which are likely to occur with respect to the prior art dimensioning methods illustrated in FIGS. 24a through 26b. Specifically, the operator may fail to dimension a line segment (a). Alternatively or additionally, the operator may insert an erroneous count of the tap bores, or improperly arrange the dimensioning lines (b) and (c) (which should be positionally exchanged for better appearance). Indeed, if the design item is complicated and requires a lot of dimensioning lines, it is difficult for an unskilled designer to form and arrange the dimensioning lines in appropriate order.

FIGS. 28a and 28b illustrate further problems which may be encountered in performing the known dimensioning method illustrated in FIGS. 25a and 25b. Specifically, in FIG. 28a, the design item is shown to include, in the designated dimensioning area, more elements than shown in FIGS. 25a and 25b. In such a case, a lot of dimensioning lines containing unnecessary ones are formed in a common stage, as shown in FIG. 28b. Thus, the known dimensioning method illustrated in FIG. 25a and 25b is impractical if the design item is complicated.

Indeed, for the design item shown in FIG. 28a, dimensioning lines should be ideally formed in such a manner as shown in FIG. 28c. However, with any known dimensioning method, such an ideal manner of dimensioning is not realizable by a substantially automatic operation.

In this way, a conventional CAD system is convenient, at least to a certain degree, for forming a design item itself. However, a subsequent dimensioning operation is time-taking and still far from virtual automation.

SUMMARY OF THE INVENTION

It is, therefore, an object of the present invention to automate a dimensioning operation in CAD to a higher degree, thereby greatly shortening the time required for preparing dimensioned drawings.

According to one aspect of the present invention, there is provided a method of performing substantially automatic dimensioning in computer aided for a design item which comprises a plurality of line segments, each of the line segments having both ends defined respectively by end point coordinates, the method comprising:

(A) table forming steps including: extracting horizontal line segments from the plurality of line segments and registering the end point coordinates of the horizontal line segments in an X-dimensioning table together with extension line orientation data for the horizontal line segments; and extracting vertical line segments from the plurality of line segments and registering the end point coordinates of the vertical line segments in a Y-dimensioning table together with extension line orientation data for the vertical line segments;

(C) provisional dimensioning steps including: generating provisional X-dimensioning lines for the horizontal line segments in different stages by referring to the X-dimensioning table; and generating provisional Y-dimensioning lines for the vertical line segments in different stages by referring to the Y-dimensioning table; and (D) layout modifying steps including: rearranging the provisional X-dimensioning lines so that larger valued X-dimensioning lines are located farther from the design item than smaller valued X-dimensioning lines; and rearranging the provisional Y-dimensioning lines so that larger valued Y-dimensioning lines are located farther from the design item than smaller valued Y-dimensioning lines.

The table forming steps may further include extracting oblique line segments from the plurality of line segments and registering the end point coordinates of the oblique line segments in the X- and Y-dimensioning tables together with extension line orientation data for the oblique line segments. In this case, the provisional dimensioning steps may further include generating provisional X- and Y-dimensioning lines for the oblique line segments by referring to the X- and Y-dimensioning tables in a manner such that the provisional dimensioning lines for the oblique line segments are formed closer to the design item than the provisional dimensioning lines for the horizontal and vertical line segments.

According to a preferred embodiment of the present invention, the method further comprises table modifying steps including finding a specific oblique line segment which is connected to a specific horizontal or vertical line segment, and replacing one of the end point coordinates of the specific horizontal or vertical line segment by one of the end point coordinates of the specific oblique line segment for modification of the X- or Y-dimensioning table with respect to the specific horizontal or vertical line segment.

The table forming steps may further include extracting a 45°-chamfer element from the plurality of line segments for registering the end point coordinates of the 45°-chamfer element in a 45°-chamfer element table. In this case, leader dimensioning is later performed for the 45°-chamfer element.

It is possible that the design item further comprises an arc element which is defined at least by end point coordinates and a radius. In this case, the table forming steps further include extracting the arc element for registering the coordinates and radius of the arc element in an arc element table, and leader dimensioning is later performed for the arc element.

If the arc element is a corner arc element which is connected with a specific horizontal line segment, one of the end point coordinates of the specific horizontal line segment may be replaced by one of the end point coordinates of the corner arc for modification of the X-dimensioning table with respect to the specific horizontal line segment. Similarly, if the corner arc element is connected to a specific vertical line element, one of the end point coordinates of the specific vertical line segment may be replaced by one of the end point coordinates of the corner arc for modification of the Y-dimensioning table with respect to the specific vertical line segment.

The table forming steps may further include extracting a section bore element from the plurality of line segments for registering the coordinates of the section bore element in a section bore element table together with relevant specifications for the section bore element. In this case, the provisional dimensioning steps may further include generating provisional X- or Y-dimensioning lines to specify a center line position of the section bore element by referring to the section bore element table in a manner such that the provisional dimensioning lines for the section bore element are formed in a stage which is different from any previously used stage, and leader dimensioning is later performed for the section bore element.

It is also possible that the design item further comprises a circle element defined by a center position coordinates and a radius. In this case, the table forming steps further include extracting a circle element for registering the coordinates and radius of the circle element in a circle element table together with relevant specifications for the circle element. Moreover, the provisional dimensioning steps further include generating provisional X- and Y-dimensioning lines to specify a center position of the circle element by referring to the circle element table in a manner such that the provisional dimensioning lines for the circle element are formed in a stage which is different from any previously used stage, and leader dimensioning is later performed for the circle element.

According to another aspect of the present invention, there is provided an apparatus for performing substantially automatic dimensioning for a design item which comprises a plurality of line segments, each of the line segments having both ends defined respectively by end point coordinates, the method comprising:

(A) table forming means for extracting horizontal line segments from the plurality of line segments and registering the end point coordinates of the horizontal line segments in an X-dimensioning table together with extension line orientation data for the horizontal line segments, the table forming means further extracting vertical line segments from the plurality of line segments and registering the end point coordinates of the vertical line segments in a Y-dimensioning table together with extension line orientation data for the vertical line segments;

(c) provisional dimensioning means for generating provisional X-dimensioning lines for the horizontal line segments in different stages by referring to the X-dimensioning table, the provisional dimensioning means further generating provisional Y-dimensioning lines for the vertical line segments in different stages by referring to the Y-dimensioning table; and (D) layout modifying means for rearranging the provisional X-dimensioning lines so that larger valued X-dimensioning lines are located farther from the design item than smaller valued X-dimensioning lines, the layout modifying means further rearranging the provisional Y-dimensioning lines so that larger valued Y-dimensioning lines are located farther from the design item than smaller valued Y-dimensioning lines.

Other objects, features and advantages of the present invention will become apparent from the following detailed description of the preferred embodiments given with reference to the accompanying drawings.

BRIEF DESCRIPTION OF THE DRAWINGS

In the accompanying drawings:

FIG. 15 is a diagram showing the content of a geometric element file;

FIG. 18 is a diagram showing the content of a 45°-chamfer element table;

FIG. 19 is a diagram showing the content of an arc element table;

FIG. 20 is a diagram showing the content of a circle element table;

FIG. 21 is a diagram showing the content of a section bore element table;

DETAILED DESCRIPTION OF THE PREFERRED EMBODIMENTS

Preferred embodiments of the present invention will now be described with reference to the accompanying drawings.

Figure 1:
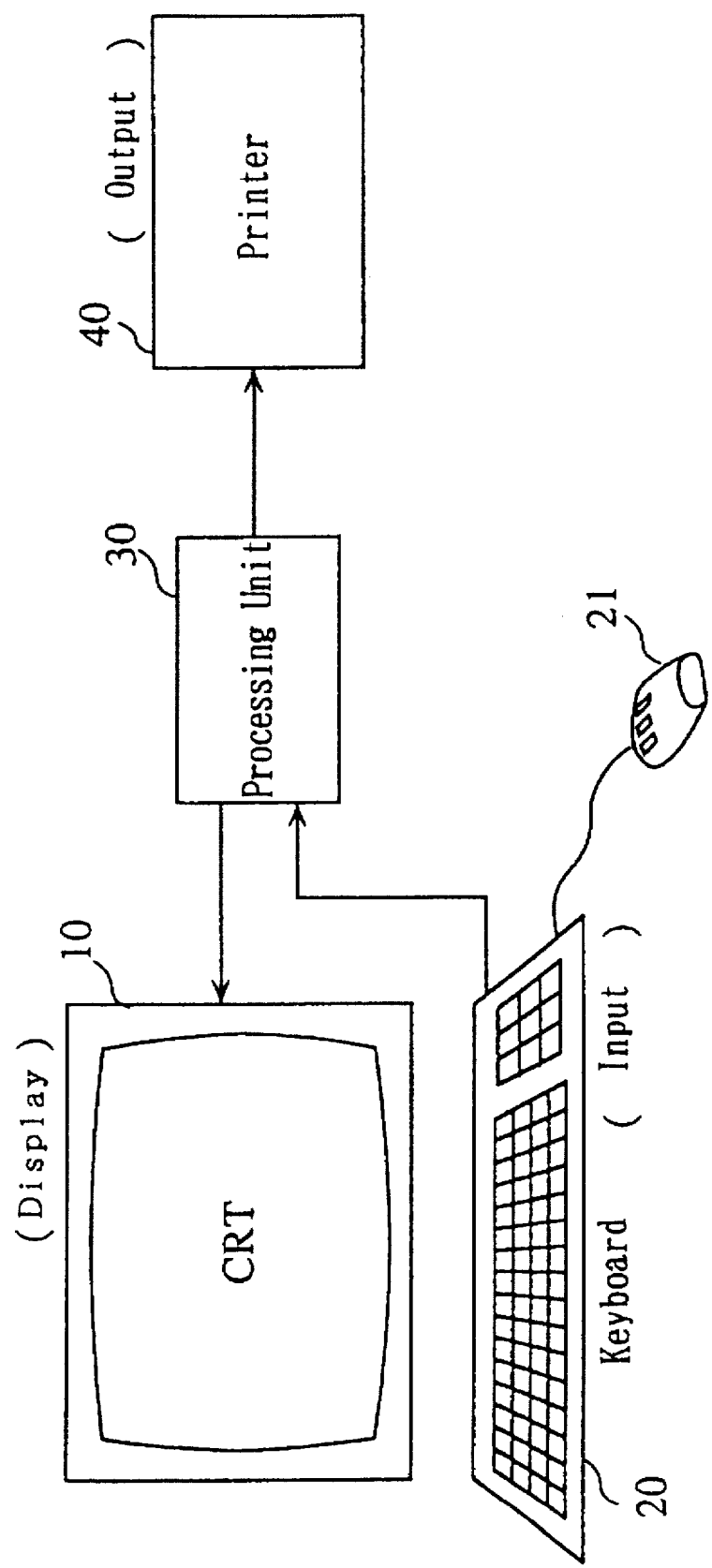
FIG. 1 is a schematic view showing a typical CAD system to which the present invention may be applied.

Referring to FIG. 1, a CAD system generally comprises a display unit 10, an input unit 20, a processing unit 30, and an output unit 40, as previously described. The display unit 10 may be a CRT for example, whereas the input unit 20 may be a keyboard which may be optionally connected to a mouse 21 for example as an auxiliary input device. The processing unit 30 comprises a computer which contains drawing process software. The output unit 40 may be a printer or plotter for example.

In use, the operator can form a desired graphic design on the CRT (display unit) 10 by operating the keyboard 20 and/or mouse 21 while following the instructions displayed on the CRT.

Figure 2:
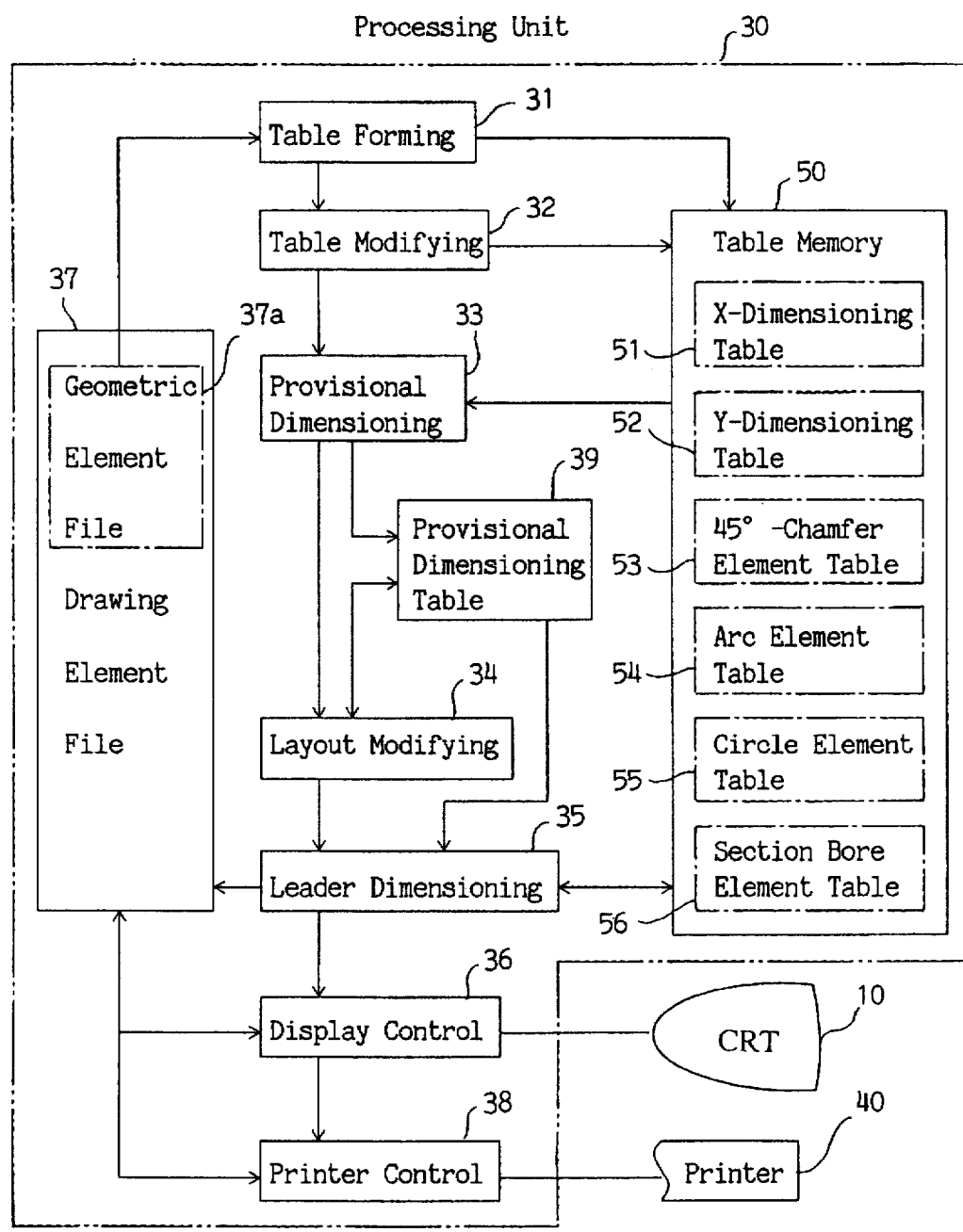
FIG. 2 is a functional block diagram showing an automatic dimensioning apparatus embodying the present invention.

FIG. 2 is a functional block diagram showing the arrangement of the processing unit 30. As shown, the processing unit 30 includes a table forming means 31 for forming dimensioning tables and for registering the formed dimensioning tables in a table memory 50. The table memory 50 includes an X-dimensioning table 51, Y-dimensioning table 52, 45°-chamfer element table 53, an arc element table 54, a circle element table 55, and a section bore element table 56.

The processing unit 30 also includes a table modifying means 32, a provisional dimensioning means 33, a layout modifying means 34, and a leader dimensioning means 35. The processing unit 30 further includes a drawing element file 37 which incorporates all geometric and dimensional elements necessary for constituting a target graphic design which is suitably.

A display control means 36 is connected to the drawing element file 37 and the CRT 10 for assembling necessary drawing elements from the file 37 into a designed image with suitable dimensioning on the CRT 10. A printer control means 38 is connected to the drawing element file 37 and the printer 40 for printing out the designed image.

A specific manner of performing automatic dimensioning is described below with reference to FIGS. 3 through 21. For convenience of the following description, a design item Z such as shown in FIGS. 11 through 14 is taken as an exemplary target for automatic dimensioning.

Figures 12A, 12B:
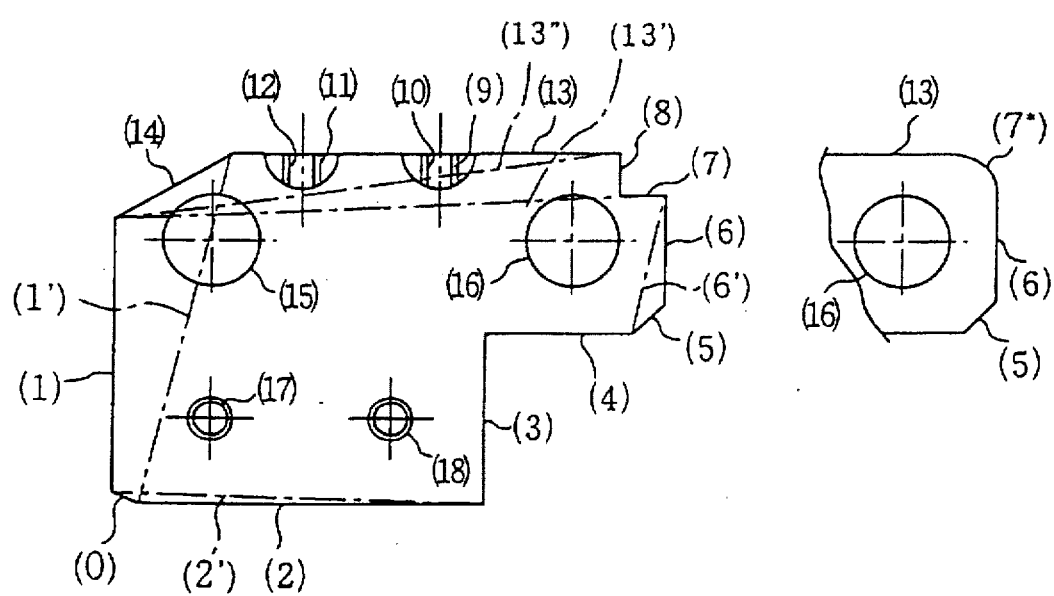
FIG. 12a is a view showing the same design item with different elements thereof specified by reference numerals.
FIG. 12b is a view showing a portion of another exemplary design item for which automatic dimensioning may be performed in accordance with the present invention.

As shown in FIG. 12a, the design item Z comprises a total of nineteen geometric elements (0)-(18). The reference numerals for these geometric elements are bracketed to make distinction from the dimensional numerals (see FIGS. 13 and 14) used for the same elements. It should be appreciated that outer circles for tap bores, outer side lines for section tap bores, semicircles for indicating section cutouts, and respective center lines are not counted here as geometric elements because these are thin-line elements which are actually depicted in a different color for example. However, these thin-line elements constitute a part of the design elements which should be stored in the drawing element file 37 (FIG. 2) together with the dimensional elements.

The geometric elements (0)-(18) are stored in a geometric element file 37a of the drawing element file 37, as shown in FIG. 2. FIG. 15 shows the content of the geometric element file 37a which is expressed as a data file. As understood from this data file, any line segment is basically defined by the respective XY-coordinates at the starting and terminal points (end points) of the line segment. The starting point is the end of the line segment which is closer to the origin of the XY-coordinate system (rectangular coordinate system), whereas the terminal point is the end of the line segment which is farther from the origin.

Figure 11:
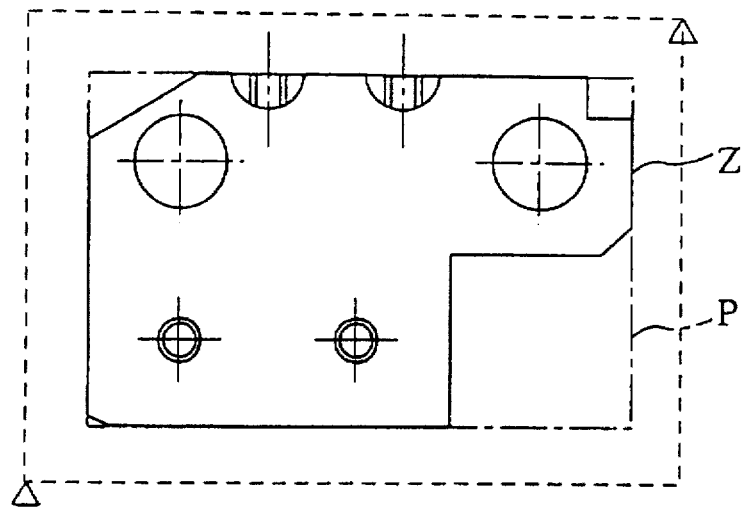
FIG. 11 is a view showing an exemplary design item for which automatic dimensioning may be performed in accordance with the present invention.

As shown in FIG. 11, the origin of the XY-coordinate system may be the lower left corner of a minimum rectangle P which fully encloses the design item Z. In the data file shown in FIG. 15, the XY-coordinates of the respective geometric elements are given by taking this corner as the origin of the coordinate system. For example, the line segment (1) in FIG. 12a has a starting point at (0, 1) and a terminal point at (0, 32). All other geometric elements are defined in a similar way.

On the other hand, each of the circle elements (15), (16) is defined by its center coordinates and its radius. The other circle elements (17), (18) may be similarly defined.

The design item Z shown in FIG. 12a does not have a corner arc element. However, the present invention may be equally applicable to a design item having a corner arc element (7*), as shown in FIG. 12b. Such a corner arc element (7*) may be defined by the starting point coordinates, terminal point coordinates, radius and center coordinates of the arc, as shown at the bottom of the date file (FIG. 15). Alternatively, the starting and terminal points of the arc may also be designated by their respective polar coordinates relative to the center XY-coordinates of the arc because polar coordinates are convertible to rectangular coordinates, as described previously.

Figure 3:
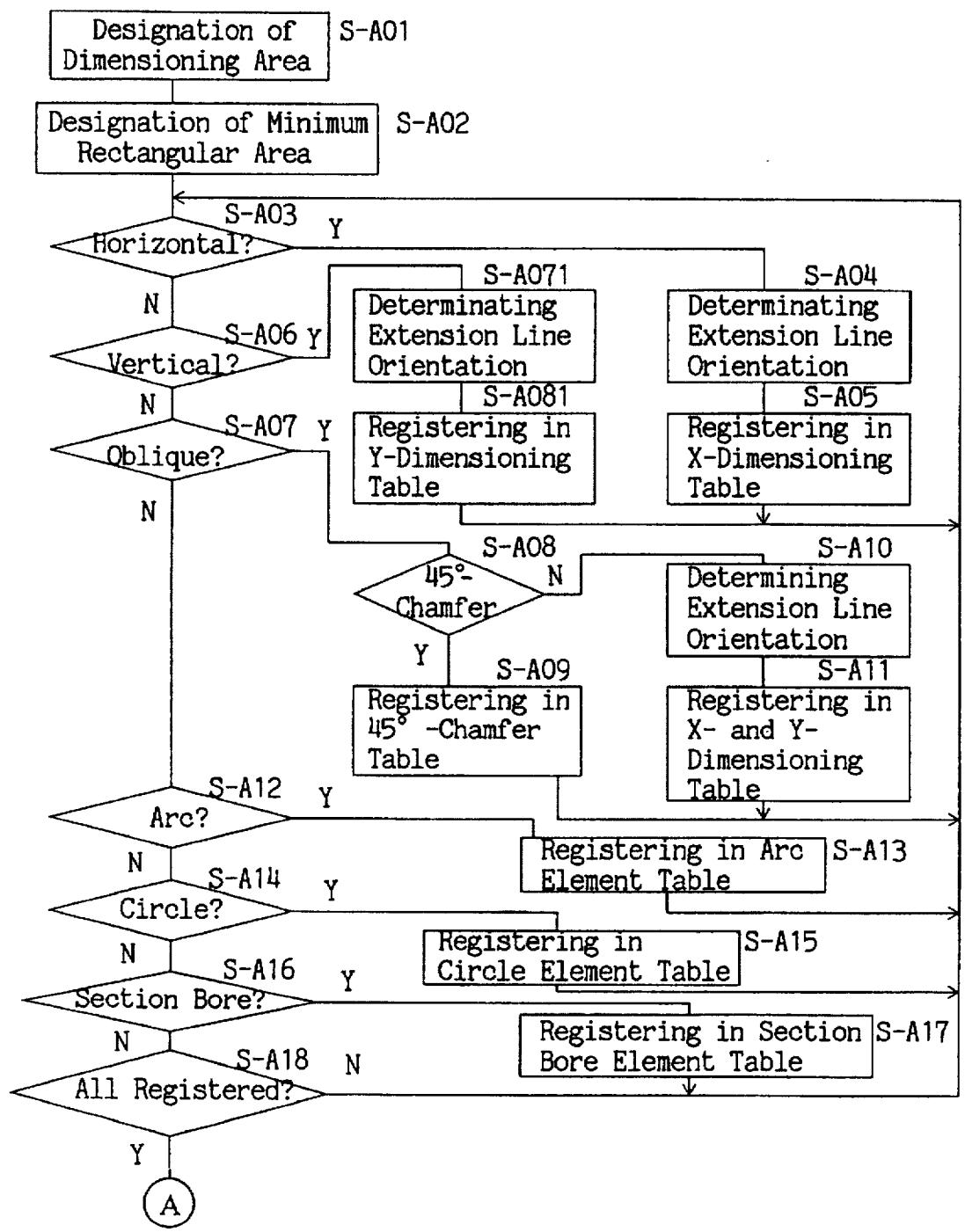
FIG. 3 is a flow diagram showing a series of table forming steps performed by the automatic dimensioning apparatus of FIG. 2.

As shown in FIG. 3, the automatic dimensioning operation according to the present invention comprises a series of table forming steps performed by the table forming means 31.

In Step S-A01, the operator designates a dimensioning area by two triangular cursors, as shown in FIG. 11. As a result, the target design item Z is designated or encircled for dimensioning. Excluding certaining exceptions, this step is basically the sole step which the operator must perform.

Then, in Step S-A02, a minimum rectangular area P is automatically designated which fully encloses the design item Z, as shown in FIG. 11. Specifically, the minimum and maximum values for the X-coordinates and Y-coordinates are respectively selected from the geometric element file 37a (i.e., the data file of FIG. 15) to define the minimum rectangle P. In the illustrated embodiment, the minimum and maximum X-values are 0 and 60, respectively, whereas the minimum and maximum Y-values are 0 and 40, respectively. The minimum rectangle P thus designated may be used as a reference for dimensioning, and it is preferable that no dimensioning line be contained in this minimum rectangle.

If a geometric element taken out from the element data file 37a is a horizontal line segment ("YES" in Step S-A03), determination is first made as to the extension line orientation (Step S-A04), followed by registration of the determined orientation in the X-dimensioning table 51 together with the element definition data of the relevant geometric element (Step S-A05).

The horizontal line segment can be identified by determining whether the respective Y-coordinates for the starting and terminal points of the line segment are equal. While the extension lines for the horizontal line segment are led out in the Y-direction, the orientation (upward or downward) of the extension lines should be determined, in principle, to make them extend outwardly from the outer contour of the design item.

For example, the extension lines for the horizontal line segment (2) should be led out downward, whereas those for the horizontal line segment (13) should be led out upward. The orientation of the extension lines may be determined in the following manner.

A downward vertical line is first drawn which passes a selected point immediately below the relevant horizontal line segment. If the downward vertical line intersects the outer contour lines of the design item by an odd number of times, it is concluded that the selected point is located inside the contour of the design item, so that the orientation of the extension lines for the relevant horizontal line segment should be upward. If, on the other hand, the downward vertical line intersects the outer contour lines of the design item by an even number of times (including none or zero), it is concluded that the selected point is outside the contour of the design item, so that the orientation of the extension lines for the relevant horizontal line segment should be downward.

Figure 16:
FIG. 16 is a diagram showing the content of an X-dimensioning table.
Figure 16:

The above-described determination as to the orientation of the extension lines is performed with respect to the horizontal line segments (2), (4), (7), (13). The obtained orientation is registered in the X-dimensioning table 51 together with the element definition data for the respective line segments, as shown in FIG. 16.

If a geometric element taken out from the element data file 37a is a vertical line segment ("YES" in Step S-A06), determination is first made as to the extension line orientation (Step S-A071), followed by registration of the determined orientation in the Y-dimensioning table 52 together with the relevant geometric element (Step S-A081).

The vertical line segment can be identified by determining whether the respective X-coordinates for the starting and terminal points of the line segment are equal.

Further, the orientation of the extension lines for the vertical line segment may be performed in a manner similar to that described for the horizontal line segment. Specifically, a leftward horizontal line is first drawn which passes a selected point immediately on the left side of the relevant vertical line segment. If the leftward horizontal line intersects the outer contour lines of the design item by an odd number of times, it is concluded that the selected point is located inside the contour of the design item, so that the orientation of the extension lines for the relevant vertical line segment should be rightward. If, on the other hand, the leftward horizontal line intersects the outer contour lines of the design item by an even number of times (including none or zero), it is concluded that the selected point is outside the contour of the design item, so that the orientation of the extension lines for the relevant vertical line segment should be leftward.

Figure 17:
FIG. 17 is a diagram showing the content of an Y-dimensioning table.
Figure 17:

The above-described determination as to the orientation of the extension lines is performed with respect to the 10 vertical line segments (1), (3), (6), (8). The obtained orientation is registered in the Y-dimensioning table 52 together with the element definition data for the respective vertical line segments, as shown in FIG. 17.

If a geometric element taken out from the element data file 37a is a oblique line segment ("YES" in Step S-A07), determination is made whether the oblique line segment is a 45°-chamfer element (Step S-A08). If "YES" in Step S-A08, the element (i.e., the XY-coordinate data thereof) is registered in the 45°-chamfer table 53 (Step S-A09), as shown in FIG. 18. According to the illustrated embodiment, only the element (5) is a 45°-chamfer element.

If "NO" in Step S-A08, determination is made as to the orientations (along the X- and the Y-axes) of the dimensioning extension lines for the oblique line segment (Step S-A10). Then, the obtained orientations for the oblique line segment are registered in both of the X- and Y-dimensioning tables 51, 52 (Step S-A11).

As described above, the determination as to the orientations of the extension lines for the oblique line segment need be performed in the X- and Y-directions. Taking the oblique line segment (14) for example, a downward vertical line drawn from the line segment intersects the contour lines of the design item only once (odd number), so that the orientation of the extension lines along the Y-axis should be upward for use in X-dimensioning. Further, a leftward horizontal line drawn from the oblique line segment (14) never intersects the the contour lines of the design item (namely, an even number of times of intersections), so the orientation of the extension lines along the X-axis should be leftward for use in Y-dimensioning. A similar determination as to the extension line orientations is also performed with respect to the oblique line segment (0).

The X-axis and Y-axis orientations of the extension lines for the oblique line segments (14), (0) are registered in the X-dimensioning table 51 and the Y-dimensioning table 52 together with the respective element definition data, as shown in FIGS. 16 and 17.

If a geometric element taken out from the element data file 37a is an arc element ("YES" in Step S-A12), the element definition data for that arc element is registered in the arc element table 54 (Step S-A13), as shown in FIG. 19. In the design item illustrated in FIG. 12a, no such element is found. However, in a modified design item shown in FIG. 12b, the element (7*) is an arc element.

If a geometric element taken out from the element data file 37a is a circle element ("YES" in Step S-A14), the element definition data for that arc element is registered in the circle element table 55 together with the relevant specifications therefor (Step S-A15), as shown in FIG. 20. For instance, since each of the circle elements (15), (16) has no accompanying circle element coaxial therewith, it is identified as a simple bore and registered as such together with the specification as to its diameter (10 mm). By contrast, since each of the circle elements (17), (18) is accompanied by a thin-line circle coaxial therewith (so recognized by referring to the geometric element file 37a), it is identified as a tap bore and registered as such together with the specification as to its nominal diameter (5 mm). The nominal diameter of the tap bore may be determined by reference to the standards (e.g. JIS: Japanese Industrial Standards) stored in the system.

Though not illustrated, it is possible that two circle elements (neither of which is indicated by a thin line) are coaxially arranged. In this case, the two circle elements are considered to represent a counterbore or countersunk hole which can be so identified by reference to the JIS stored in the system.

Then, section bore elements are extracted from the element data file 37a (Step S-A16). In the illustrated embodiment, the elements (9), (10) as well as the elements (11), (12) represent a section bore. More specifically, the line segments (9), (10) are equally spaced from a common center line and terminate at a same contour line of the design item, so that these line segments (9), (10) are recognized as representing a single bore. Further, since the line segments (9), (10) are flanked by a pair of thin-line segments, it concluded that the bore represented by the elements (9), (10) is a tap bore. The same is also applicable with respect to the line segments (11), (12).

Each of the section bores thus identified as a tap bore are registered as such in the section bore table 56 together with the specification as to its nominal diameter (4 mm) (Step S-A17), as shown in FIG. 21. Again, the nominal diameter of the tap bore may be determined by reference to the JIS stored in the system.

Figure 4:
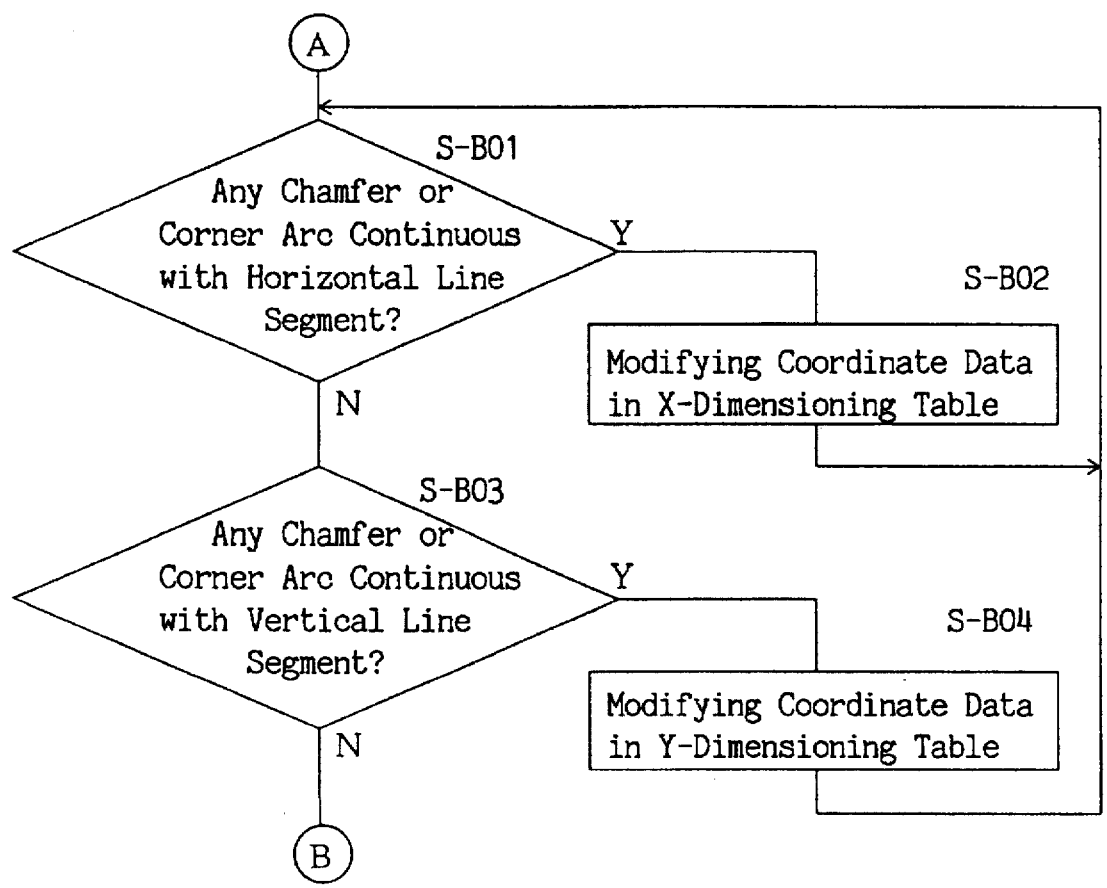
FIG. 4 is a flow diagram showing a series of table modifying steps performed by the automatic dimensioning apparatus of FIG. 1.

The series of table forming steps described above is followed by a series of table modifying steps which is performed by the table modifying means 32 (FIG. 2) and illustrated in FIG. 4. In the series of table modifying steps, the X-dimensioning table 51 (see FIGS. 2 and 16) and the Y-dimensioning table 52 (see FIGS. 2 and 17) are partially modified, as described below.

First, Step S-B01 is performed to determine whether there is any chamfer element or corner arc element which is connected to a horizontal line element. Here, the "chamfer element" includes a 45°-chamfer and a non-45°-chamfer (namely, an oblique line segment having an inclination angle other than 45°).

According to the example shown in FIG. 12a, the horizontal line segment (13) is connected to the oblique line segment or chamfer element (14), whereas the horizontal line segment (2) meets the oblique line segment (0). Thus, the horizontal line segments (13), (2) are subjected to data modification.

In Step S-B02, the horizontal line segment found to meet a chamfer element is subjected to data modification with respect to the X-dimensioning table 51 (FIGS. 2 and 16). Specifically, the starting point or terminal point coordinates of the horizontal line segment is replaced by an end point coordinates of the chamfer element. The term "end point" used herein means either the starting or terminal point of the chamfer element because each of the starting and terminal points is located at an end of the chamfer element (i.e. oblique line segment).

According to the example illustrated in FIG. 12a, specifically, the starting point coordinates (12, 40) of the horizontal line segment (13) is replaced by the starting point coordinates (0, 32) of the chamfer element (14) and so registered, as indicated at 13" in FIG. 16. Similarly, the starting point coordinates (3, 0) of the horizontal line segment (2) is replaced by the starting point coordinates (0, 1) of the chamfer element (0) and so registered, as indicated at 2' in FIG. 16. Further, due to the presence of a rectangular cutout at the upper right corner of the design item, the terminal point coordinates (55, 40) of the horizontal line segment (13) is also replaced by the terminal point coordinates (60, 35) of the horizontal line segment (7) and so registered, as indicated at 13' in FIG. 16.

Due to the above-described partial modification of the X-dimensioning table 51, X-dimensioning is performed with respect to the modified element (13') or (13") in place of the actual element (13). Similarly, X-dimensioning is performed with respect to the modified element (2') in place of the actual element (2).

Then, Step S-B03 is performed to determine whether there is any chamfer element or corner arc element which is connected to a vertical line element. In the example shown in FIG. 12a, the vertical line segment (6) meets the 45°-chamfer element (5), whereas the vertical line segment (1) is connected to the two oblique line segments (14), (0).

In Step S-B04, the vertical line segment found to be connected to a chamfer element is subjected to data modification with respect to the Y-dimensioning table 52 (FIGS. 2 and 17). According to the example illustrated in FIG. 12a, specifically, the starting point coordinates (60, 23) of the vertical line segment (6) is replaced by the starting point coordinates (57, 20) of the 45°-chamfer element (5) and so registered, as indicated at 6' in FIG. 17. Similarly, the starting point coordinates (0, 1) of the vertical line segment (1) is replaced by the terminal point coordinates (3, 0) of the chamfer element (0) and so registered, as indicated at 1' in FIG. 17. Further, the terminal point coordinates (0, 32) of the vertical line segment (1) is replaced by the terminal point coordinates (12, 40) of the chamfer element (14) and so registered, as also indicated at 1' in FIG. 17.

Due to the above-described partial modification of the Y-dimensioning table 52, Y-dimensioning is performed with respect to the modified element (6') in place of the actual element (6). Similarly, Y-dimensioning is performed with respect to the modified element (0') in place of the actual element (0).

Figure 5:
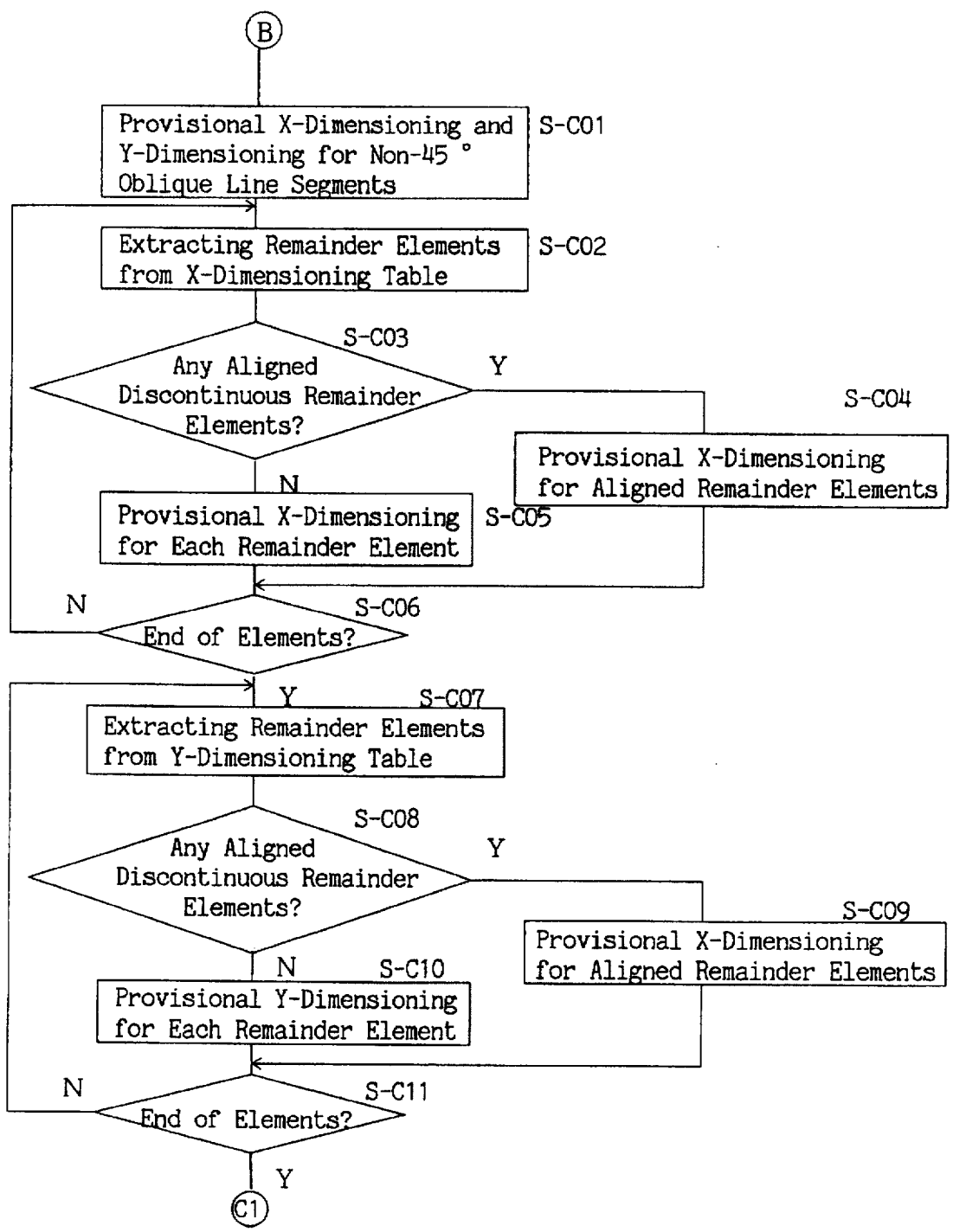
FIGS. 5 through 7 are consecutive pieces of a flow diagram showing a series of provisional dimensioning steps performed by the automatic dimensioning apparatus of FIG. 1.
Figure 6:
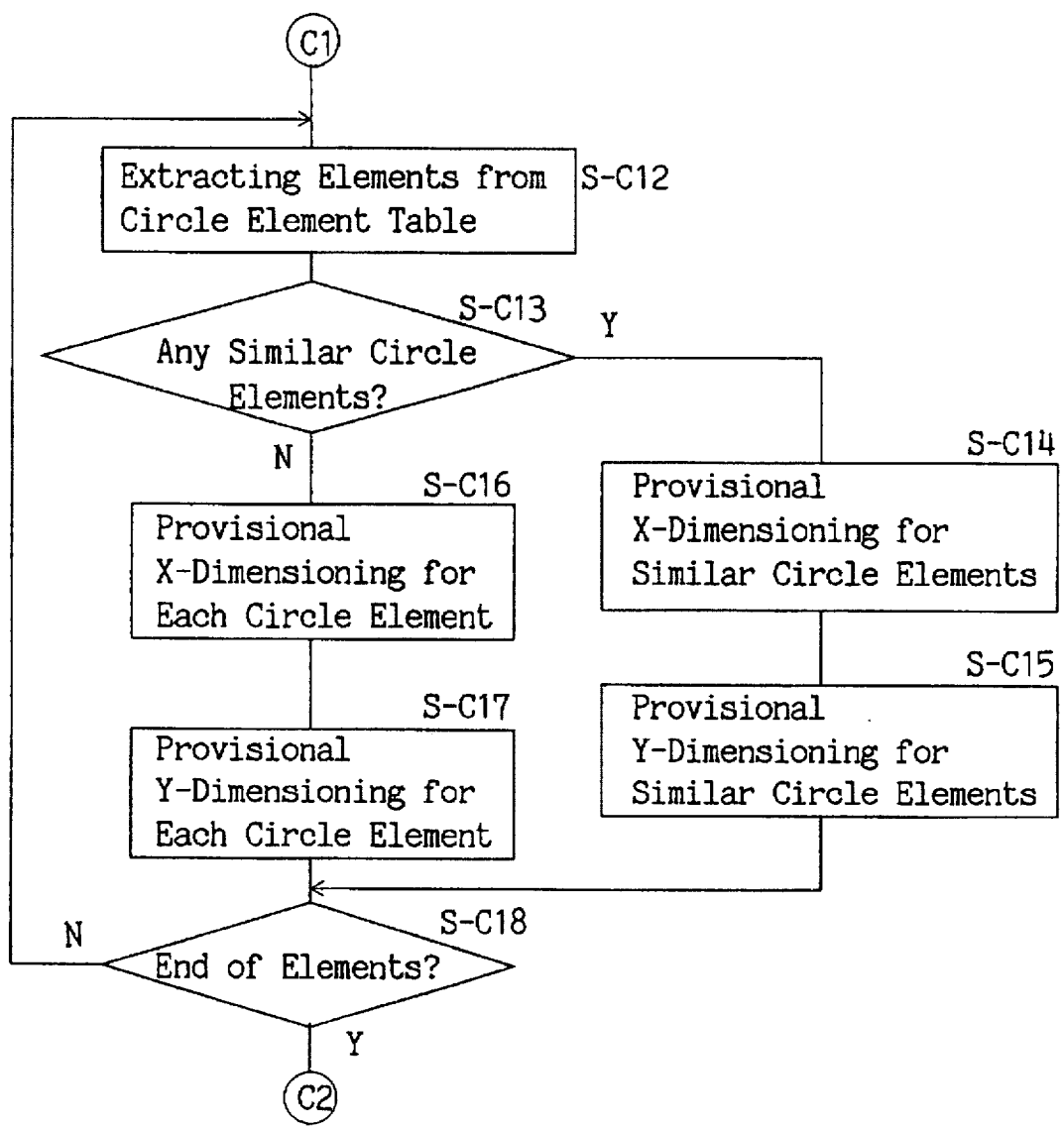
Figure 7:
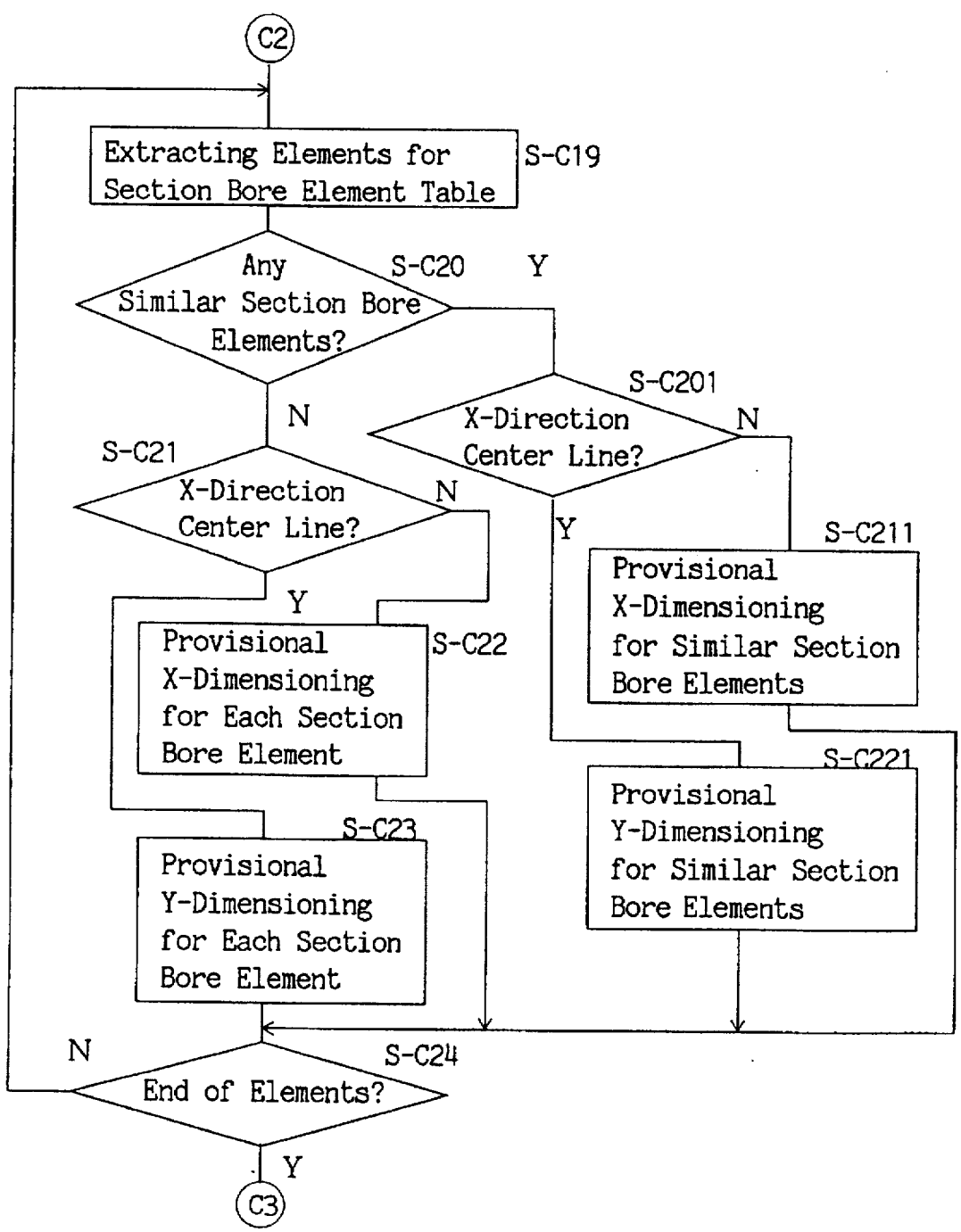

The series of table modifying steps described above is followed by a series of provisional dimensioning steps which is performed by the provisional dimensioning means 33 (FIG. 2) and illustrated in FIGS. 5 through 7.

First, in Step S-C01 (FIG. 5), provisional X-dimensioning and provisional Y-dimensioning are performed with respect to each of the oblique line segments which is not a 45°-chamfer element. The oblique line segments may be found out by referring to the X-dimensioning table 51 (FIG. 16) and Y-dimensioning table 52 (FIG. 17). According to the example shown in FIG. 12a, the two oblique line segments (0), (14) are applicable, and it is preferable that the provisional X-dimensioning and Y-dimensioning be performed in a first stage.

Figure 13:
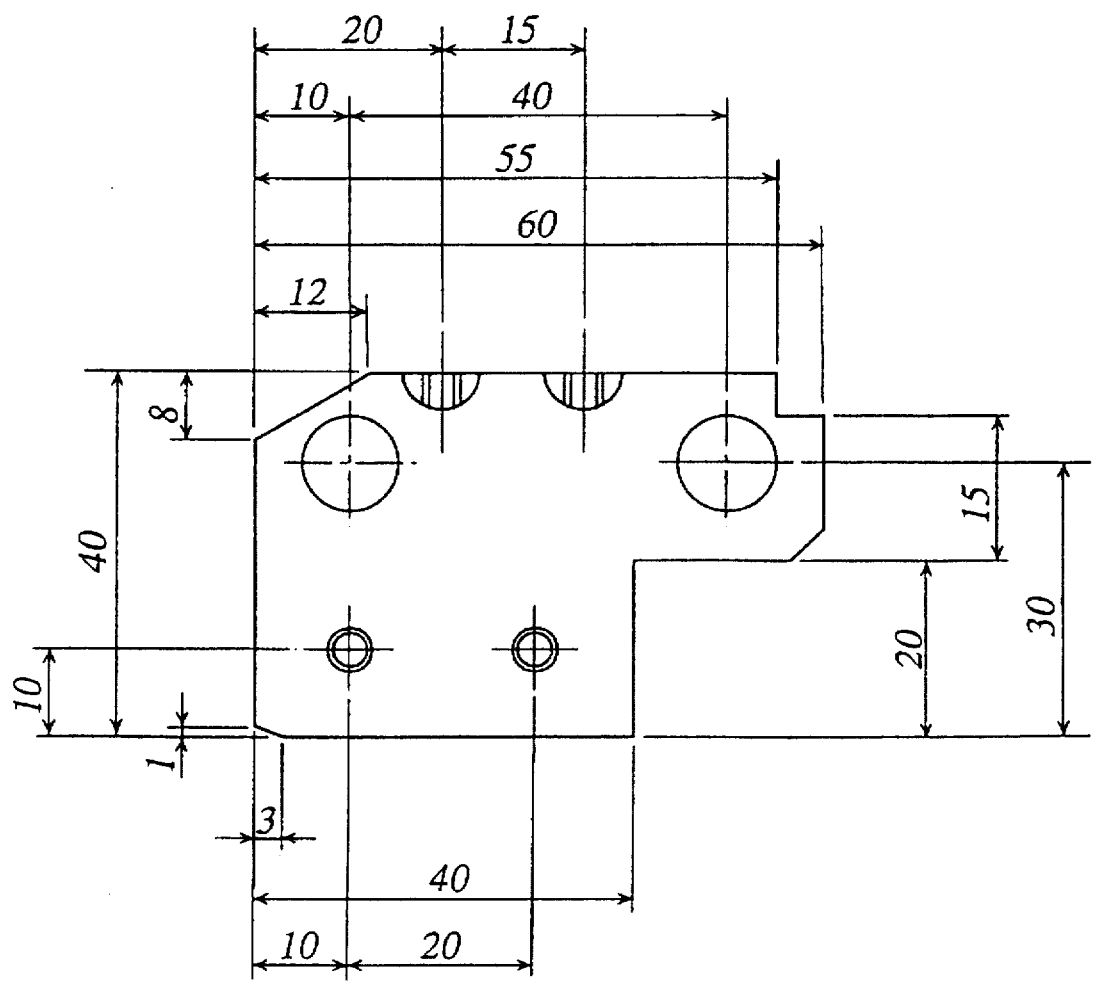
FIG. 13 is a view showing the design item of FIG. 11 after performing provisional dimensioning.

In the provisional X-dimensioning of the oblique line segment (14), specifically, extension lines are generated to extend upward in the Y-direction from both ends of the line segment (14), followed by generation of a double-arrow dimension line which is located in an upward first stage and accompanied by a suitable dimension value, as shown in FIG. 13. In the provisional X-dimensioning of the oblique line segment (0), similarly, extension lines are generated to extend downward in the Y-direction from both ends of the line segment (0), followed by generation of a double-arrow dimension line which is located in a downward first stage and accompanied by a suitable dimension value.

In the provisional Y-dimensioning of each of the oblique line segments (14), (0), on the other hand, extension lines are generated to extend leftward in the X-direction from both ends of the line segment, followed by generation of a double-arrow dimension line which is located in a leftward first stage and accompanied by a suitable dimension value, as also shown in FIG. 13. In this case, since both oblique line segments (14), (0) are connected the same vertical line segment (1), it is preferable for reasons of better appearance that the Y-direction double-arrow dimension lines for these oblique elements be located in the same first stage. Such is possible by inserting a predetermined algorithm.

The thus generated provisional dimensioning lines, which include the extension lines and the double-arrow dimension lines, are provisionally registered in a provisional dimensioning table 39 (see FIG. 2) together with the relevant dimension values. This also applies to the other provisional dimensioning lines to be described below.

In Step S-C02, the remainder elements (namely, non-oblique line segments) are extracted from the X-dimensioning table 51 (see FIGS. 2 and 16).

In Step S-C03, determination is made whether any particular one of the extracted remainder elements is aligned with but spaced from (i.e., discontinuous with) another of the extracted elements. When the particular element has the same Y-coordinate as the other element, they are determined to be aligned.

If "YES" in Step S-C03, provisional X-dimensioning is performed together for the aligned elements and for a further element between the aligned elements (Step S-C04). For reasons of better appearance, such provisional X-dimensioning is carried out in a common stage which is farther from the design item than any previously used stage or stages. In the example shown in FIG. 12a, however, there are no two line segments which are aligned along the X-axis.

If "NO" in Step S-C03 (which is applicable to the example shown in FIG. 12a), provisional X-dimensioning is performed for each of the extracted remainder elements in a stage which is farther from the design item than any previously used stage or stages (S-C05). According to the example shown in FIG. 12a, specifically, provisional X-dimensioning is performed for the modified line segment (13"), which is a substitute for the non-oblique line segment (13), in an upward second stage which is located outwardly from the upward first stage used for the X-dimensioning of the chamfer element (14), as shown in FIG. 13. Further, provisional X-dimensioning is performed for the modified line segment (13'), which is another substitute for the non-oblique line segment (13), in an upward third stage which is located outwardly from the upward second stage. Moreover, provisional X-dimensioning is also performed for the modified line segment (2'), which is a substitute for the non-oblique line segment (2), in a downward second stage which is located outwardly from the downward first stage used for the X-dimensioning of the chamfer element (0).

It should be appreciated here that any previously formed extension line or lines can be automatically extended further when commonly used for any later dimensioning.

Upon completion of the provisional X-dimensioning ("YES" in Step S-C06), the remainder elements (non-oblique line segments) are extracted from the Y-dimensioning table 52 (Step S-C07).

In Step 8-C08, determination is made whether any particular one of the extracted remainder elements is aligned with but spaced from another of the extracted elements. When the particular element has the same X-coordinate as the other element, they are determined to be aligned.

If "YES" in Step S-C08, provisional Y-dimensioning is performed together for the aligned elements and for a further element between the aligned elements (Step S-C09). Such provisional X-dimensioning is carried out in a common stage which is farther from the design item than any previously used stage or stages.

Figure 23:
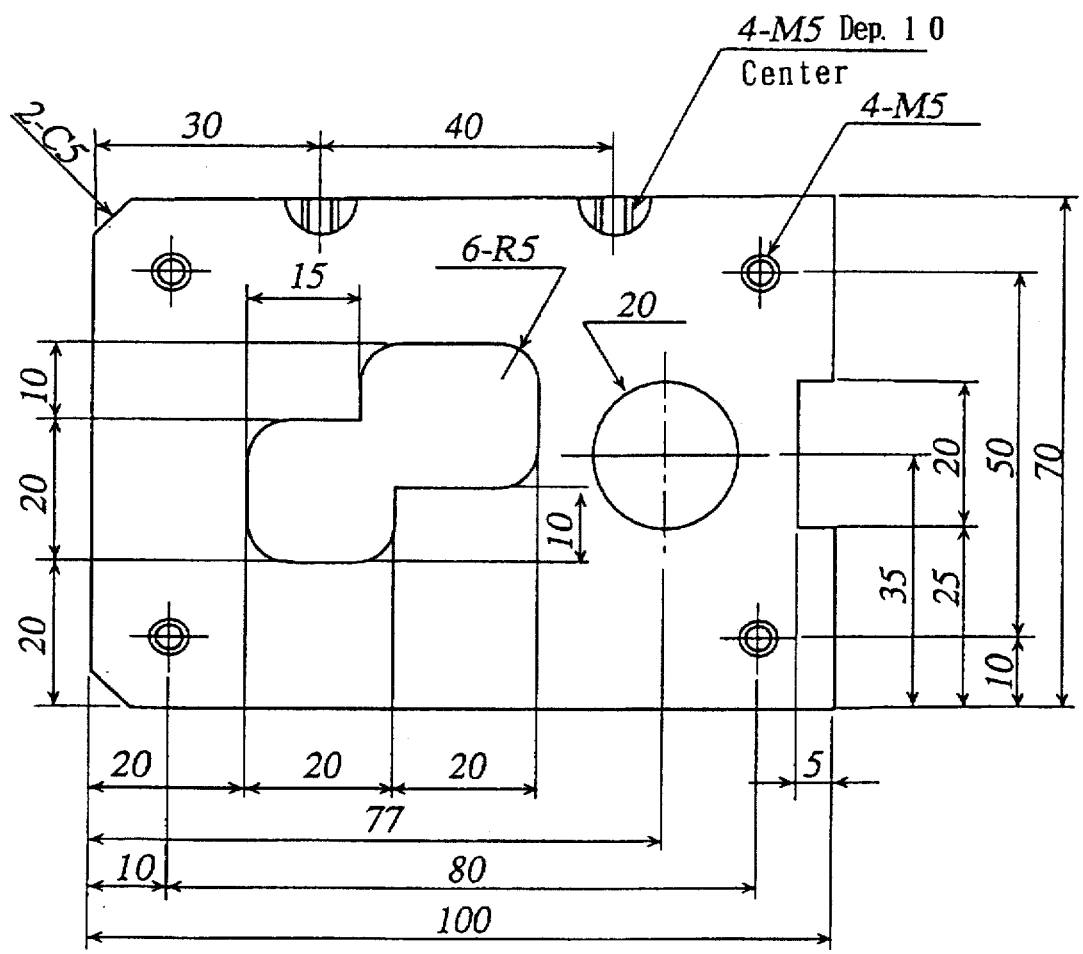
FIG. 23 is a view of a further design item which has been already subjected to automatic dimensioning in accordance with the present invention.
Figure 24A:
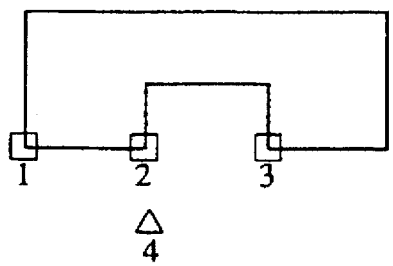
FIGS. 24a through 26b are views illustrating three different examples of known dimensioning.
Figure 24B:
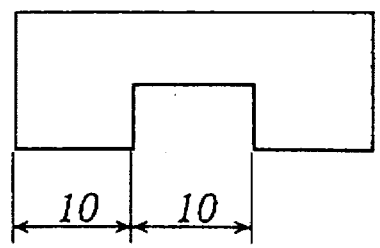
Figure 25A:
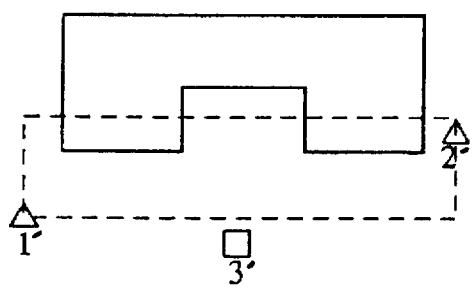
Figure 25B:
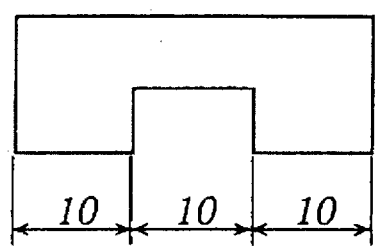
Figure 26A:
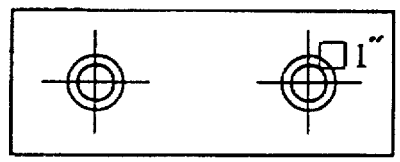
Figure 26B:
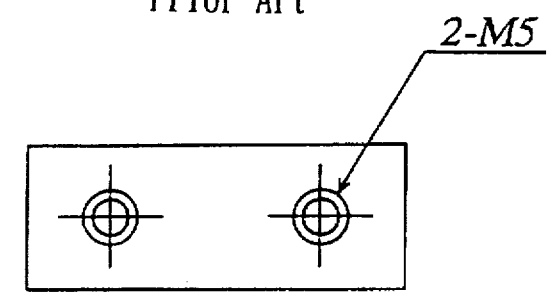
Figure 27:
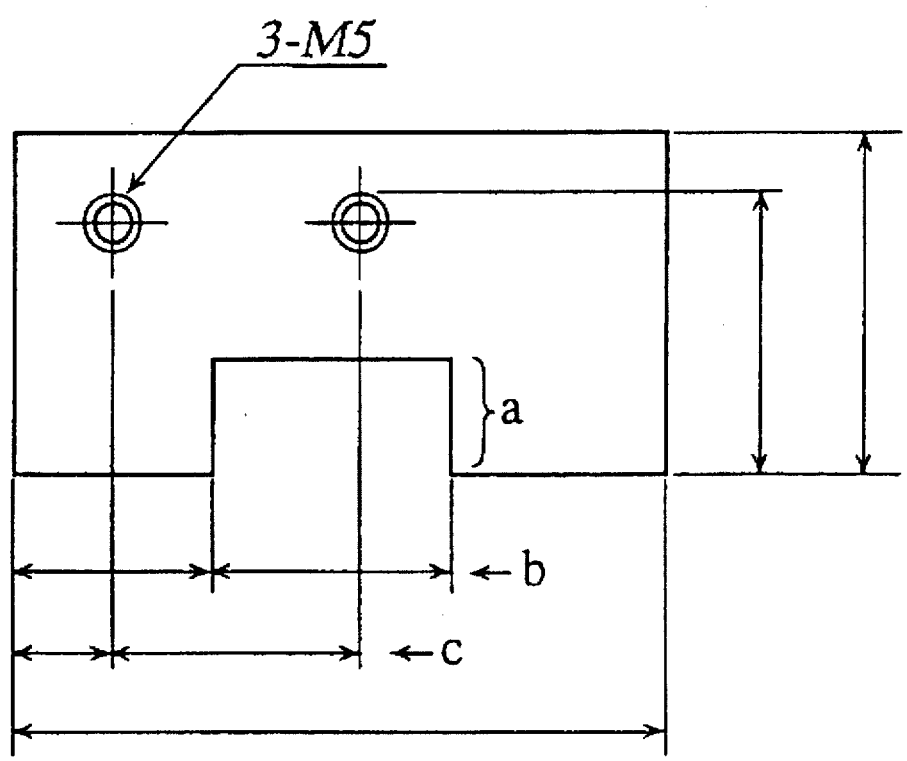
FIG. 27 is a view illustrating typical errors encountered in the known dimensioning methods shown in FIGS. 25a through 26b.
Figure 28A:
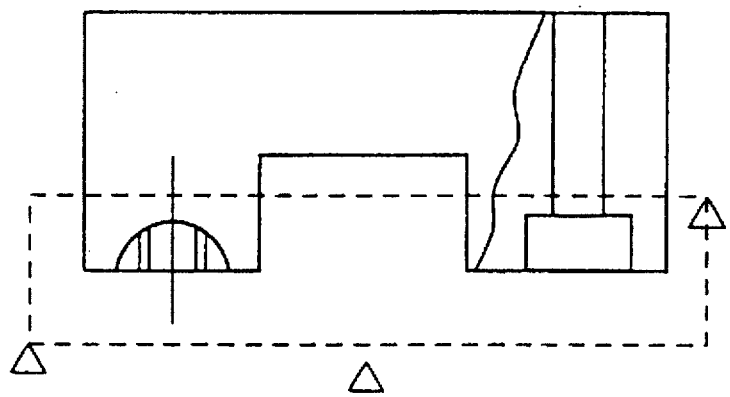
FIGS. 28a and 28b are views illustrating disadvantages encountered in the known dimensioning method shown in FIGS. 25a and 25b.
Figure 28B:
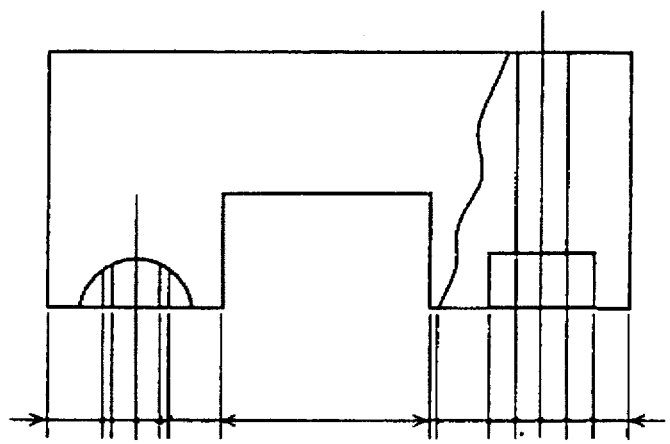
Figure 28C:
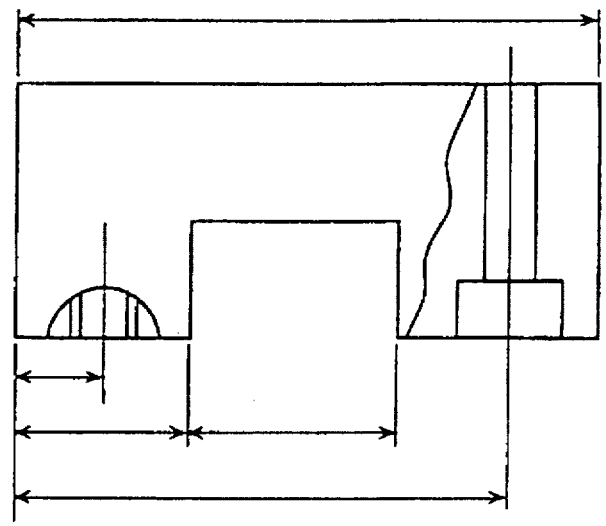
FIG. 28c is a view illustrating an ideal manner in which dimensioning lines are formed and arranged.

In the example shown in FIG. 12a, there are no two line segments which are aligned along the Y-axis. However, in a different example shown in FIG. 23, the right-hand side of the design item has two vertical line segments which are aligned with but spaced from each other. Thus, for reasons of better appearance, Y-dimensioning for these two vertical line segments and for a further vertical line segment therebetween should be performed together in a common stage, as illustrated in FIG. 23.

If "NO" in Step S-C09, provisional Y-dimensioning is performed for each of the extracted remainder elements in a stage which is farther from the design item than any previously used stage or stages (S-C10). According to the example shown in FIG. 12a, specifically, provisional Y-dimensioning is performed for the modified line segment (1'), which is a substitute for the non-oblique line segment (1), in a leftward second stage which is located outwardly from the leftward first stage used for the Y-dimensioning of the chamfer elements (14), (0), as shown in FIG. 13. Further, similar Y-dimensioning is performed for the modified line segment (6'), which is a substitute for the non-oblique line segment (6), as well as for the line segment (3).

After completing the provisional Y-dimensioning based on the Y-dimensioning table 52 ("YES" in Step S-C11), use is made of the circle element table 55 (FIGS. 2 and 20) to perform further provisional dimensioning (FIG. 6).

In Step S-C12, the circle elements are extracted from the circle element table 55.

In Step S-C13, determination is made whether plural ones of the extracted circle elements are similar to each other. According to the example shown in FIG. 12a, the circle elements (15), (16) are similar to each other (because they are identically specified as a simple bore), as also are the circle elements (17), (18).

If "YES" in Step S-C13, provisional X-dimensioning is performed together for the similar circle elements to specify the respective center positions of the similar circle elements (Step S-C14). Specifically, provisional X-dimensioning is performed together for the circle elements (15), (16) in a common stage (namely, upward fourth stage) which is located upwardly outward from any previously formed stage. As a result, the respective center positions of the circle elements (15), (16) are specified in the X-direction by giving the distance between the center of the circle (15) and the leftward edge of the design item, as well as the distance between the centers of the two circles (15), (16). Similar X-dimensioning is also performed with respect to the other circle elements (17), (18) which are similar to each other.

In Step S-C15, provisional Y-dimensioning is performed together for the circle elements (15), (16) in a stage which is located rightwardly outward from any previously formed stages. As a result, the respective center positions of the circle elements (15), (16), which are identically located in the Y-direction, are specified in the Y-direction by giving the distance between the center of the circle (16) and the lower edge of the design item. Similar Y-dimensioning is also performed with respect to the other circle elements (17), (18) which are similar to each other.

If "NO" in Step S-C13 (no similar circle elements), the center position of each circle element is separately specified by provisional X- and Y-dimensioning (Steps S-C16 and S-C17).

After completing the provisional dimensioning for the circle elements ("YES" in Step S-C18), use is made of the section bore element table 56 (FIGS. 2 and 21) to perform still further provisional dimensioning (FIG. 7).

In Step S-C19, the section bore elements are extracted from the section bore element table 56.

In Step S-C20, determination is made whether plural ones of the extracted section bore elements are similar to each other. According to the example shown in FIG. 12a, the two tap bores identified by the elements (9), (10) and (11), (12), respectively, are similar to each other.

If "YES" in Step S-C20, determination is then made whether the respective center axes of the similar section bore elements extend in the X-direction.

If the respective center axes are found to extend in the Y-direction ("NO" in Step S-C201), provisional X-dimensioning is performed together for the similar section bore elements to specify the respective center axis positions of the similar section bore elements (Step S-C211). Specifically, as shown in FIG. 13, two extension lines are drawn upward by extending the respective center axes of the section bores, and two double-arrow lines accompanied by relevant dimension values are formed in a common stage (namely, upward fifth stage) which is located upwardly outward from any previously formed stage. As a result, the respective center axis positions of the section bore elements are specified in the X-direction by giving the distance between the center axis of the left-hand bore (11) (12) and the leftward edge of the design item as well as the distance between the center axes of the two bores.

If the respective center axes are found to extend in the X-direction ("YES" in Step S-C201), similar provisional Y-dimensioning is performed together for the similar section bore elements to specify the respective center axis positions of the similar section bore elements (Step S-C221). However, this is not applicable to the example shown in FIG. 13.

If "NO" in Step S-C20 (no similar circle elements), the center axis position of each section bore element is separately specified by provisional X- and Y-dimensioning (Steps S-C21, S-C22 and S-C23).

Figure 8:
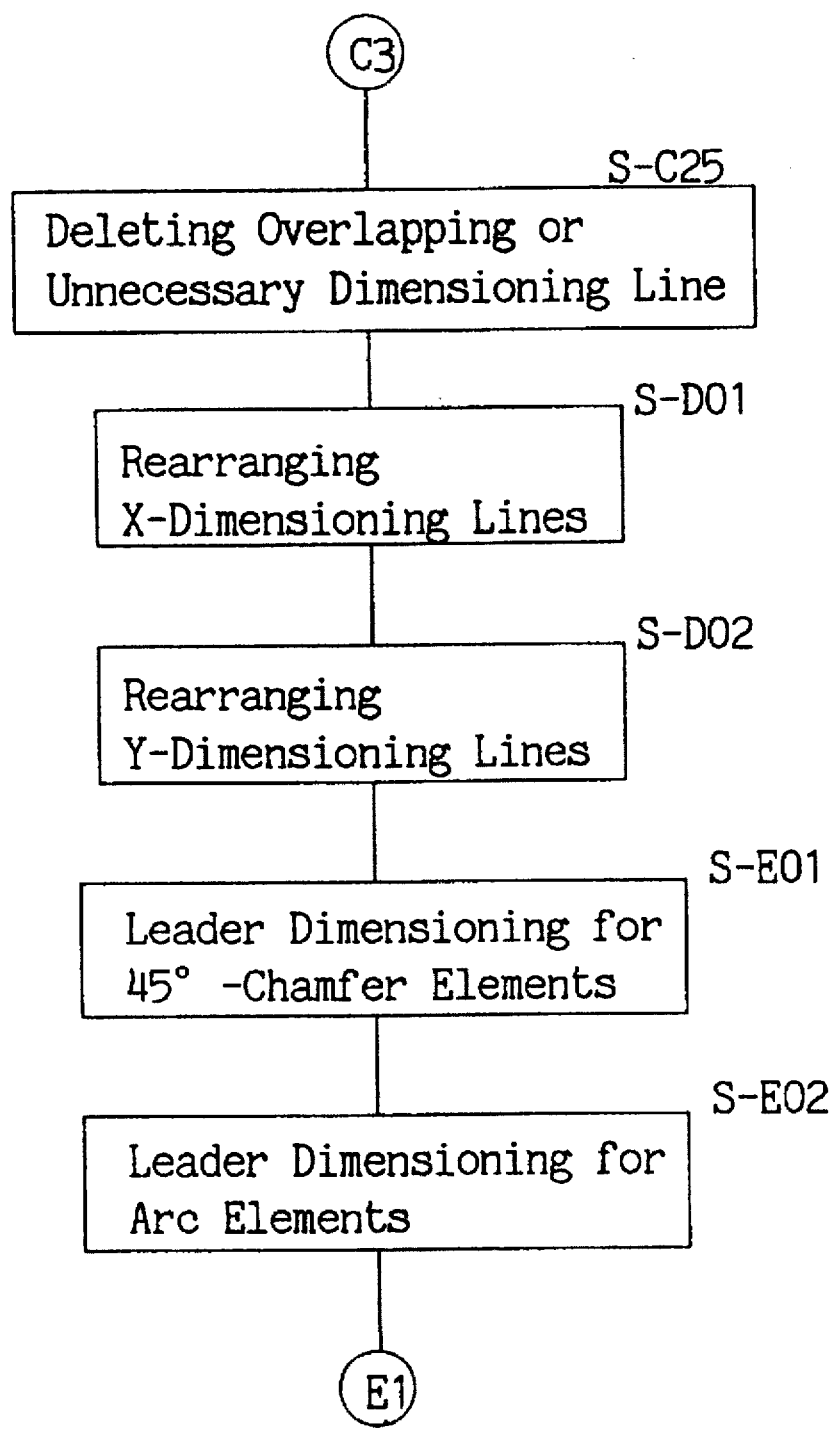
FIG. 8 is a flow diagram showing a series of layout modifying steps, which is followed by part of a series of leader dimensioning steps, performed by the automatic dimensioning apparatus of FIG. 1.

Upon finishing the provisional dimensioning for the section bore elements ("YES" in Step S-C24), overlapping and/or unnecessary ones of the dimensioning lines are deleted according to a predetermined algorithm in Step S-C25 (FIG. 8). However, Step S-C25 may be dispensed with if the provisional dimensioning is performed in a manner such that overlapping and/or unnecessary dimensioning lines are not generated.

FIG. 13 shows the design item which has undergone the entire series of provisional dimensioning steps. As shown, the dimensioning lines positionally specify all of the elements except for the 45°-chamfer element. However, since there are many intersections between the extension lines and the double-arrow dimension lines, the dimensioning lines as a whole provide a very poor appearance.

Thus, the layout modifying means 34 (FIG. 2) is then caused to perform a series of layout modifying steps (FIG. 8) for improving the appearance of the provisionally generated dimensioning lines.

Specifically, in Step S-D01, the X-dimensioning lines formed in different stages are rearranged so that larger valued dimensioning lines are located farther from the design item than smaller valued dimensioning lines. Similarly, in Step S-D02, the Y-dimensioning lines formed in different stages are rearranged so that larger valued dimensioning lines are located farther from the design item than any smaller valued dimensioning lines. Such rearrangement may be carried out by sorting the provisional dimensioning data stored in the provisional dimensioning table 39 (see FIG. 2).

Figure 14:
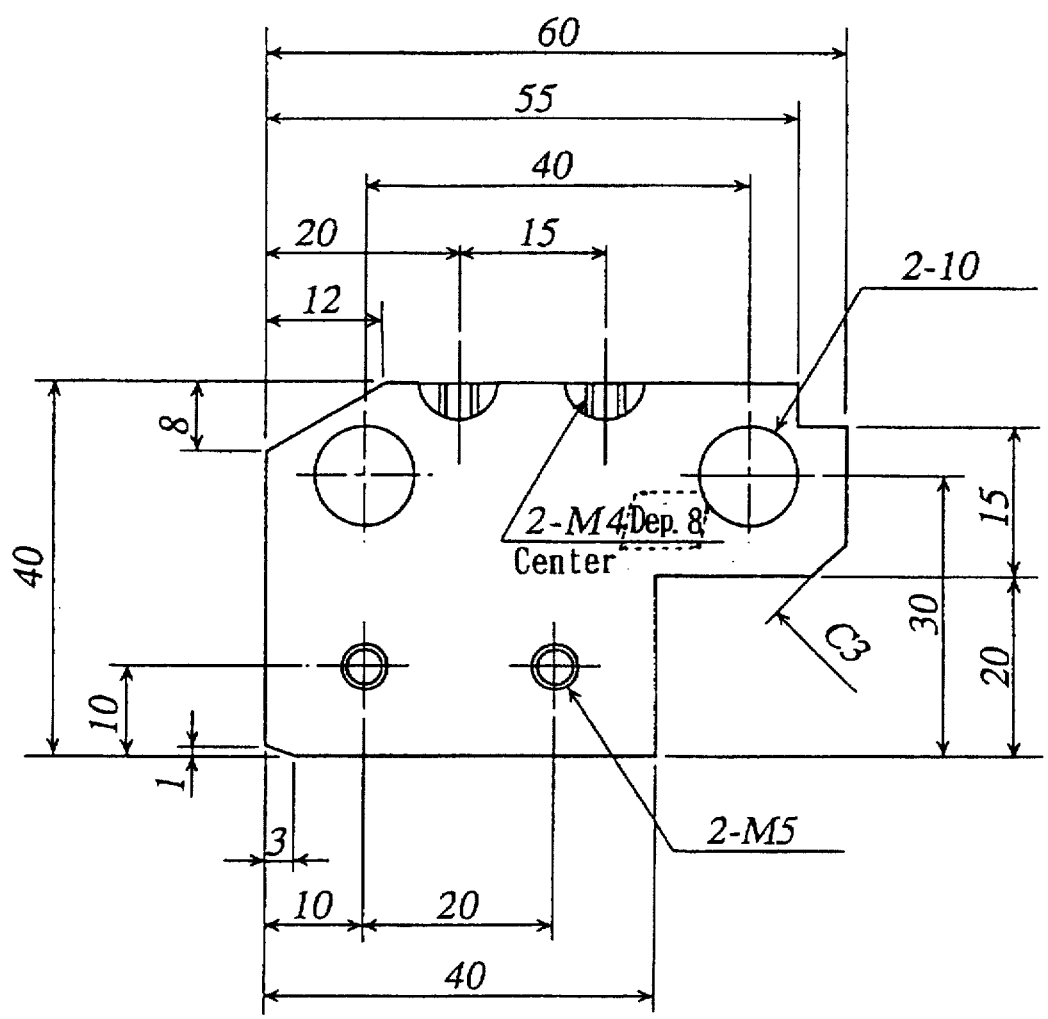
FIG. 14 is a view showing the design item of FIG. 11 after completing the automatic dimensioning.

FIG. 14 shows the design item which has undergone the above-described rearrangement of the dimensioning lines in addition to the deletion of the overlapping and/or unnecessary ones of the dimensioning lines. It is seen that the arrangement of the dimensioning lines is greatly improved for better visual recognition of the different dimensions. As previously described, the dimensioning lines for the oblique line segments (0), (14) remain as initially generated in the first stage which is closest to the design item.

It should be understood that the specific order or sequence of rearranging the differently staged dimensioning lines may be optionally selected as long as the desired ideal arrangement of the dimensioning lines is ultimately achieved.

Figure 9:
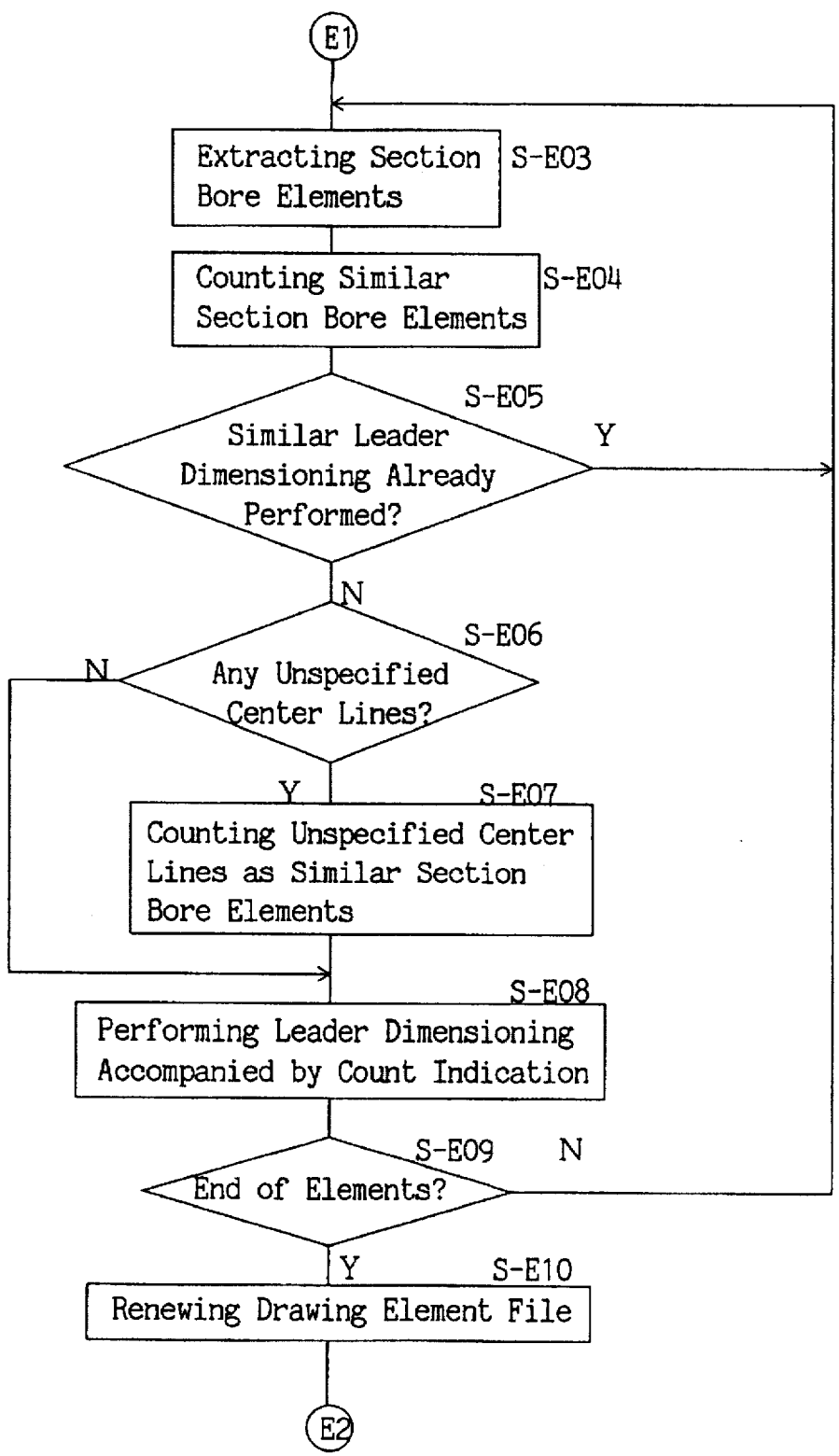
FIG. 9 is a flow diagram showing the remaining part of the series of leader dimensioning steps performed by the automatic dimensioning apparatus of FIG. 1.

After rearranging and definitely determining the X- and Y-dimensioning lines, the leader dimensioning means 35 (FIG. 2) is caused to perform a series of leader dimensioning steps (FIGS. 8 and 9).

Specifically, in Step S-E01, leader dimensioning is performed for the 45°-chamfer element taken out from the 45°-chamfer element table 53 (FIGS. 2 and 18). According to the example shown in FIG. 12a, only the element (5) (FIG. 12a) is a 45°-chamfer element, and a leader is automatically generated for this element together with a relevant dimensional indication "C3", as shown in FIG. 14.

If there are a plurality of similar 45°-chamfers, they are automatically counted, and the count is automatically incorporated in the dimensional indication.

In Step S-E02, leader dimensioning is performed for the arc element taken out from the arc element table 54 (FIGS. 2 and 19). There is no arc element in the example shown in FIG. 12a, but the modified item shown in FIG. 12b has one arc element (7*). Thus, a leader is automatically generated for such an arc element together with a relevant dimensional indication.

Leader dimensioning for the circle elements and the section bore elements is similar because each of the circle elements becomes a section bore element when sectioned.

Thus, for purposes of simplicity, only the leader dimensioning for the section bore elements is described below by referring to FIG. 9. It should be noted however that FIG. 14 shows the results of leader dimensioning not only for the section bore elements but also for the circle elements, thereby giving a clearer idea as to the practicality of the present invention.

In Step S-E03, the section bore elements are extracted from the section bore element table 56 (see FIGS. 2 and 21).

In Step S-E04, similar ones of the section bore elements are counted. According to the example shown in FIG. 12a, the two M4 tap bores are considered similar.

In Step S-E05, determination is made whether there are any other views of the same design item wherein the relevant section bore elements are already subjected to similar leader dimensioning. The purpose of such determination is to prevent performing similar leader dimensioning twice or more in case where the same section bore elements appear in different views of the same design item. According to the example shown in FIGS. 11, 12a, 13 and 14, there is only a single view of the design item Z, hence "NO" in Step S-E05.

In Step S-E06, determination is made whether there are any unspecified center lines in any views of the relevant design item. According to the example shown in FIGS. 11, 12a, 13 and 14, there is only a single view of the design item Z, and the two center lines are already specified as the center lines for the two tap bores, hence "NO" in Step S-E06. Thus, in subsequent Step S-E08, leader dimensioning is performed for one of the two similar tap bores to give a dimensional indication "2-M4" which represents that the count of the similar bores having a nominal diameter of 4 mm is two. However, the depth indication for the bores need be performed manually, as more specifically described later.

Figure 22A:
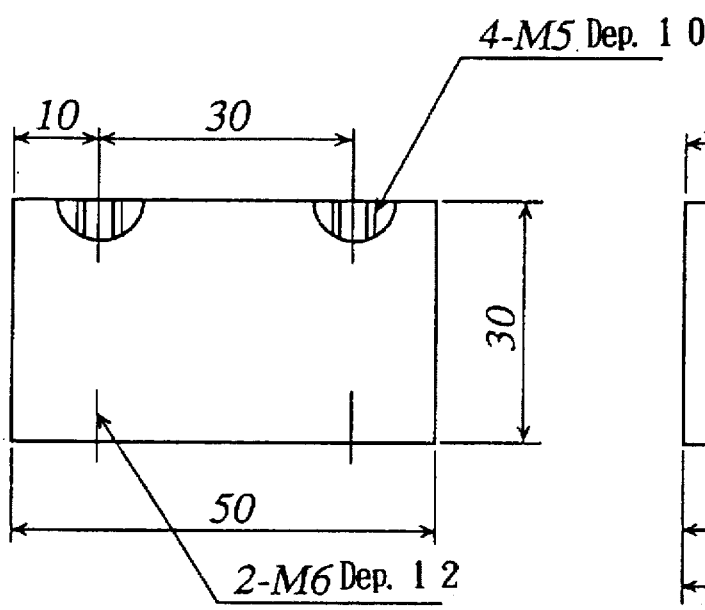
FIGS. 22a and 22b are different views of still another design item which have been already subjected to automatic dimensioning in accordance with the present invention.
Figure 22B:
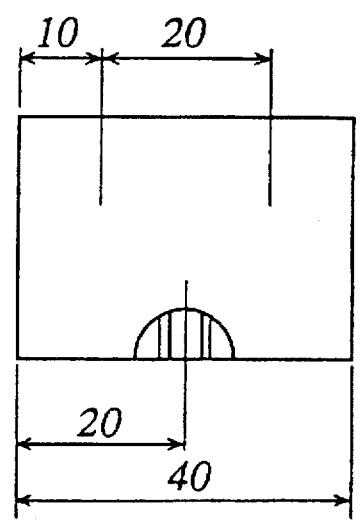

Now, Steps S-E06 and S-E07 are more specifically addressed by referring to FIGS. 22a and 22b which show different views (partially sectioned front and side views, respectively) of a design item. As illustrated, the front view (FIG. 22a) contains upper two center lines specified as those for M5 tap bores as well as lower two center lines which are unspecified, whereas the side view (FIG. 22b) includes upper two unspecified center lines as well as a lower center line which is specified as that for a M6 tap bore. In this case, the judgment in Step S-E06 is "YES", and Step S-E07 follows.

In Step S-E07, the two unspecified center lines contained in the front view are assumed similar to the lower center line for the M6 tap bore, thereby yielding a total count of two M6 tap bores. Similarly, the two unspecified center lines contained in the side view are assumed similar to the upper center lines for the M5 tap bores, thereby yielding a total count of four M5 tap bores. Then, Step S-E08 follows in the same manner as already described.

Upon finishing the leader dimensioning with respect to all of the section bore elements ("YES" in Step S-E09), the set of dimensioning data already generated and stored in the provisional dimensioning table 39 (FIG. 2) up to that time is conclusively determined and used for data renewal in the drawing element file (Step S-E10).

Figure 10:
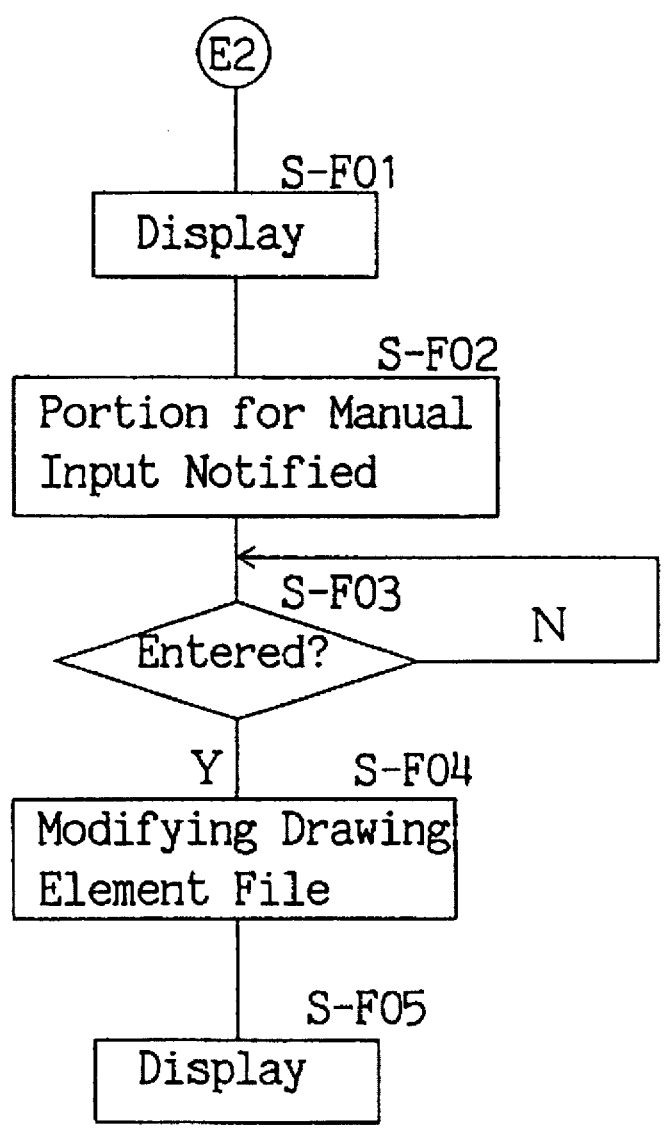
FIG. 10 is a flow diagram showing a series of dimensioning completing steps performed by the automatic dimensioning apparatus of FIG. 1.

The image of the design item as thus suitably dimensioned is displayed on the CRT 10 (FIGS. 1 and 2) by way of the display control means 36 in Step S-F01 (FIG. 10). As previously described, a depth indication still need be provided for the M4 section tap bores (FIG. 14). According to the present embodiment, a portion (encircled by broken lines in FIG. 14) requiring a manual indication input may be visually notified to the operator by flickering in a different color (Step S-F02). Then, the operator (designer) manually enters the required depth indication through the keyboard 20 (FIG. 1) for example ("YES" in Step S-F03). As a result, the drawing element file 37 (FIG. 2) is further renewed or modified to incorporate the manually entered data (Step S-F04), and the final image is displayed (Step S-F05).

In this way, the dimensioning for the design item is performed almost automatically. The final result is illustrated in FIG. 14 (for the design item shown in FIGS. 11 and 12a), or in FIGS. 22a and 22b (for the design item shown therein), or in FIG. 23 (for the design item shown therein). In either instance, it will be appreciated that the dimensioning lines are arranged suitably to provide improved appearance and ready visual reading of the dimensions for the various parts or elements of the design item.

According to the present invention as specifically described on the basis of the preferred embodiment or embodiments, it is only necessary to define or designate an area which encloses a design item, or a view or views thereof, requiring automatic or substantially automatic dimensioning. Thus, compared with the prior art dimensioning methods used in CAD, the degree of automation in dimensioning is remarkably enhanced, thereby reducing the time for designing or drawing.

The present invention being thus described, it is obvious that the same may be varied in many ways. For instance, one or more of the steps shown in the flow diagrams of FIGS. 3 through 10 may or may not be essential for a given purpose. Further, one or more additional steps may be inserted for automatically performing special dimensioning on the basis of a specific algorithm. Such variations are not to be regarded as a departure from the spirit and scope of the the invention, and all such modifications as would be obvious to those skilled in the art are intended to be included within the scope of the following claims.

I claim:

1. A method of performing substantially automatic dimensioning in computer aided design for a design item which comprises a plurality of line segments stored in a geometric element file, each of the line segments having both ends defined respectively by end point coordinates, the method comprising:

(a) an area defining step for defining: an area which encompasses the design item to be automatically dimensioned;

(b) table forming steps including: automatically extracting horizontal line segments from the geometric element file and automatically registering the end point coordinates of the horizontal line segments in an X-dimensioning table together with extension line orientation data for the horizontal line segments; and automatically extracting vertical line segments from the geometric element file and automatically registering the end point coordinates of the vertical line segments in a Y-dimensioning table together with extension line orientation data for the vertical line segments;

(d) provisional dimensioning steps including: automatically generating provisional X-dimensioning lines for the horizontal line segments in different stages by referring to the X-dimensioning table; and automatically generating provisional Y-dimensioning lines for the vertical line segments in different stages by referring to the Y-dimensioning table; and (e) layout modifying steps including: automatically rearranging the provisional X-dimensioning lines so that larger valued X-dimensioning lines are located farther from the design item than smaller valued X-dimensioning lines; and automatically rearranging the provisional Y-dimensioning lines so that larger valued Y-dimensioning lines are located farther from the design item than smaller valued Y-dimensioning lines.

2. The method according to claim 1, wherein the table forming steps further include extracting oblique line segments from the plurality of line segments and registering the end point coordinates of the oblique line segments in the X- and Y-dimensioning tables together with extension line orientation data for the oblique line segments; the provisional dimensioning steps further including generating provisional X- and Y-dimensioning lines for the oblique line segments by referring to the X- and Y-dimensioning tables in a manner such that the provisional dimensioning lines for the oblique line segments are formed closer to the design item than the provisional dimensioning lines for the horizontal and vertical line segments.

3. The method according to claim 2, further comprising:

(c) table modifying steps including: finding a specific oblique line segment which is connected to a specific horizontal line segment; and replacing one of the end point coordinates of the specific horizontal line segment by one of the end point coordinates of the specific oblique line segment for modification of the X-dimensioning table with respect to the specific horizontal line segment, said one of the end point coordinates of the specific horizontal line segment corresponding to an end of the specific horizontal line segment for connection to the specific oblique line segment, said one of the end point coordinates of the specific oblique line segment corresponding to an end of the specific oblique line segment apart from the specific horizontal line segment.

4. The method according to claim 2, further comprising:

(c) table modifying steps including finding a specific oblique line segment which is connected to a specific vertical line segment; and replacing one of the end point coordinates of the specific vertical line segment by one of the end point coordinates of the specific oblique line segment for modification of the Y-dimensioning table with respect to the specific vertical line segment, said one of the end point coordinates of the specific horizontal line segment corresponding to an end of the specific horizontal line segment for connection to the specific oblique line segment, said one of the end point coordinates of the specific oblique line segment corresponding to an end of the specific oblique line segment apart from the specific horizontal line segment.

5. The method according to claim 1, wherein the table forming steps further include extracting a 45°-chamfer element from the plurality of line segments and registering the end point coordinates of the 45°-chamfer element in a 45°-chamfer element table; the method further comprising performing leader dimensioning for the 45°-chamfer element.

6. The method according to claim 1, wherein the design item further comprises an arc element which is defined at least by end point coordinates and a radius; the table forming steps further including extracting the arc element and registering the coordinates and radius of the arc element in an arc element table; the method further comprising performing leader dimensioning for the arc element.

7. The method according to claim 6, wherein the art element is a corner arc element which is connected to a specific horizontal line segment; the method further comprising:

(c) table modifying steps including replacing one of the end point coordinates of the specific horizontal line segment by one of the end point coordinates of the corner arc element for modification of the X-dimensioning table with respect to the specific horizontal line segment, said one of the end point coordinates of the specific horizontal line segment corresponding to an end of the specific horizontal line segment for connection to the corner arc element segment, said one of the end point coordinates of the corner arc element corresponding to an end of the corner arc element apart from the specific horizontal line segment.

8. The method according to claim 6, wherein the arc element is a corner arc element which is connected to a specific vertical line segment; the method further comprising:

(c) table modifying steps including replacing one of the end point coordinates of the specific vertical line segment by one of the end point coordinates of the corner arc element for modification of the Y-dimensioning table with respect to the specific vertical line segment, said one of the end point coordinates of the specific horizontal line segment corresponding to an end of the specific horizontal line segment for connection to the corner arc element segment, said one of the end point coordinates of the corner arc element corresponding to an end of the corner arc element apart from the specific horizontal line segment.

9. The method according to claim 1, wherein the table forming steps further include extracting a section bore element from the plurality of line segments and registering the coordinates of the section bore element in a section bore element table together with relevant specifications for the section bore element; the provisional dimensioning steps further including generating provisional X- or Y-dimensioning lines to specify a center line position of the section bore element by referring to the section bore element table in a manner such that the provisional dimensioning lines for the section bore element are formed in a stage which is different from any previously used stage; the method further comprising performing leader dimensioning for the section bore element.

10. The method according to claim 1, wherein the design item further comprises a circle element defined by a center position coordinates and a radius; the table forming steps further include extracting a circle element and registering the coordinates and radius of the circle element in a circle element table together with relevant specifications for the circle element; the provisional dimensioning steps further including generating provisional X- and Y-dimensioning lines to specify a center position of the circle element by referring to the circle element table in a manner such that the provisional dimensioning lines for the circle element are formed in a stage which is different from any previously used stage; the method further comprising performing leader dimensioning for the circle element.

11. An apparatus for performing substantially automatic dimensioning in computer aided design for a design item which comprises a plurality of line segments stored in a geometric element file, each of the line segments having both ends defined respectively by end point coordinates, the method comprising:

(a) an area defining step for defining an area which encompasses the design item to be automatically dimensioned;

(b) table forming means for automatically extracting horizontal line segments from the geometric element file and automatically registering the end point coordinates of the horizontal line segments in an X-dimensioning table together with extension line orientation data for the horizontal line segments, the table forming means further automatically extracting vertical line segments from the geometric element file and automatically registering the end point coordinates of the vertical line segments in a Y-dimensioning table together with extension line orientation data for the vertical line segments;

(d) provisional dimensioning means for automatically generating provisional X-dimensioning lines for the horizontal line segments in different stages by referring to the X-dimensioning table, the provisional dimensioning means further automatically generating provisional Y-dimensioning lines for the vertical line segments in different stages by referring to the Y-dimensioning table; and (e) layout modifying means for automatically rearranging the provisional X-dimensioning lines so that larger valued X-dimensioning lines are located farther from the design item than smaller valued X-dimensioning lines, the layout modifying means further automatically rearranging the provisional Y-dimensioning lines so that larger valued Y-dimensioning lines are located farther from the design item than smaller valued Y-dimensioning lines.

12. The apparatus according to claim 11, wherein the table forming means further extracts oblique line segments from the plurality of line segments for registering the end point coordinates of the oblique line segments in the X- and Y-dimensioning tables together with extension line orientation data for the oblique line segments; the provisional dimensioning means further generating provisional X- and Y-dimensioning lines for the oblique line segments by referring to the X- and Y-dimensioning tables in a manner such that the provisional dimensioning lines for the oblique line segments are formed closer to the design item than the provisional lines for the horizontal and vertical line segments.

13. The apparatus according to claim 12, further comprising:

(c) table modifying means for finding a specific oblique line segment which is connected to a specific horizontal line segment and for replacing one of the end point coordinates of the specific horizontal line segment by one of the end point coordinates of the specific oblique line segment for modification of the X-dimensioning table with respect to the specific horizontal line segment, said one of the end point coordinates of the specific horizontal line segment corresponding to an end of the specific horizontal line segment for connection to the specific oblique line segment, said one of the end point coordinates of the specific oblique line segment corresponding to an end of the specific oblique line segment apart from the specific horizontal line segment.

14. The apparatus according to claim 12, further comprising:

(c) table modifying means for finding a specific oblique line segment which is connected to a specific vertical line segment and for replacing one of the end point coordinates of the specific vertical line segment by one of the end point coordinates of the specific oblique line segment for modification of the Y-dimensioning table with respect to the specific vertical line segment, said one of the end point coordinates of the specific horizontal line segment corresponding to an end of the specific horizontal line segment for connection to the specific oblique line segment, said one of the end point coordinates of the specific oblique line segment corresponding to an end of the specific oblique line segment apart from the specific horizontal line segment.

15. The apparatus according to claim 11, wherein the table forming means further extracts a 45°-chamfer element from the plurality of line segments for registering the end point coordinates of the 45°-chamfer element in a 45°-chamfer element table, the apparatus further comprising leader dimensioning means for performing leader dimensioning for the 45°-chamfer element.

16. The apparatus according to claim 11, wherein the design item further comprises an arc element which is defined at least by end point coordinates and a radius, the table forming means extracting the arc element for registering the coordinates and radius of the arc element in an arc element table, the apparatus further comprising leader dimensioning means for performing leader dimensioning for the arc element.

17. The apparatus according to claim 16, wherein the arc element is a corner arc element which is connected to a specific horizontal line segment; the apparatus further comprising:

(c) table modifying means for replacing one of the end point coordinates of the specific horizontal line segment by one of the end point coordinates of the corner arc element for modification of the X-dimensioning table with respect to the specific horizontal line segment, said one of the end point coordinates of the specific horizontal line segment corresponding to an end of the specific horizontal line segment for connection to the specific corner arc element segment, said one of the end point coordinates of the corner arc element corresponding to an end of the corner arc element apart from the specific horizontal line segment.

18. The apparatus according to claim 16, wherein the arc element is a corner arc element which is connected to a specific vertical line segment; the apparatus further comprising:

(c) table modifying means replacing one of the end point coordinates of the specific vertical line segment by one of the end point coordinates of the corner are for modification of the Y-dimensioning table with respect to the specific vertical line segment, said one of the end point coordinates of the specific horizontal line segment corresponding to an end of the specific horizontal line segment for connection to the specific corner arc element segment, said one of the end point coordinates of the corner arc element corresponding to an end of the corner arc element apart from the specific horizontal line segment.

19. The apparatus according to claim 11, wherein the table forming means further extracts a section bore element from the plurality of line segments for registering the coordinates of the section bore element in a section bore element table together with relevant specifications for the section bore element, the provisional dimensioning means further generating provisional X- or Y-dimensioning lines to specify a center line position of the section bore element by referring to the section bore element table in a manner such that the provisional dimensioning lines for the section bore element are formed in a stage which is different from any previously used stage; the apparatus further comprising leader dimensioning means for performing leader dimensioning for the section bore element.

20. The apparatus according to claim 11, wherein the design item further comprises a circle element defined by a center position coordinates and a radius, the table forming means further extracting a circle element for registering the coordinates and radius of the circle element in a circle element table together with relevant specifications for the circle element, the provisional dimensioning means further generating provisional X- and Y-dimensioning lines to specify a center position of the circle element by referring to the circle element table in a manner such that the provisional dimensioning lines for the circle element are formed in a stage which is different from any previously used stage; the apparatus further comprising leader dimensioning means for performing leader dimensioning for the circle element.

* * * * *